(12) United States Patent
Petersen et al.

(10) Patent No.: US 12,033,140 B2
(45) Date of Patent: *Jul. 9, 2024

(54) EFFICIENT, ACCURATE, AND SECURE PROCESSING OF CONVERSIONS BETWEEN DIGITAL ASSETS

(71) Applicant: Bakkt Marketplace, LLC, Atlanta, GA (US)

(72) Inventors: Christopher Michael Petersen, Lakeway, TX (US); Jeffrey Scott Pittelkau, Montgomery, AL (US); Nikolais Linsteadt, Applegate, CA (US); Joseph Arthur Revnes, Atlanta, GA (US); Brian Daniel Cooper, Marietta, GA (US); William Matthau, Laguna Niguel, CA (US); Yamini Bistesh Sagar, Alpharetta, GA (US); Nicolas Frederic Cabrera, Atlanta, GA (US); Utkarsh Agarwal, Tucson, AZ (US); Tim Kuchlein, Cupertino, CA (US); Bharath Lakshmanan, San Ramon, CA (US); William Andrew Bryant, Alpharetta, GA (US); Stephen Paul Saucier, Atlanta, GA (US); Deepak Kumar, Marietta, GA (US); Anil Jaiswal, Marietta, GA (US); Byungkwon Jeon, Cumming, GA (US); Balaji Devarasetty, Atlanta, GA (US)

(73) Assignee: BAKKT MARKETPLACE, LLC, Atlanta, GA (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/377,178

(22) Filed: Jul. 15, 2021

(65) Prior Publication Data
US 2022/0188811 A1 Jun. 16, 2022

Related U.S. Application Data

(60) Provisional application No. 63/199,244, filed on Dec. 16, 2020.

(51) Int. Cl.
*G06Q 20/38* (2012.01)
*G06Q 20/06* (2012.01)
(Continued)

(52) U.S. Cl.
CPC ........... *G06Q 20/381* (2013.01); *G06Q 20/06* (2013.01); *G06Q 20/3676* (2013.01); *G06Q 20/38215* (2013.01); *H04L 67/133* (2022.05)

(58) Field of Classification Search
CPC .. G06Q 20/381; G06Q 20/06; G06Q 20/3676; G06Q 20/38215; G06Q 2220/00;
(Continued)

(56) References Cited

U.S. PATENT DOCUMENTS 10,055,715 B1 8/2018 Grassadonia et al.
10,269,009 B1 4/2019 Winklevoss et al.
(Continued)

FOREIGN PATENT DOCUMENTS

WO 2017/070469 A1 4/2017
WO 2017/132333 A1 8/2017
(Continued)

OTHER PUBLICATIONS

International Searching Authority, International Search Report and Written Opinion for International Application No. PCT/US2021/050066, dated Nov. 24, 2021, (15 pages), European Patent Office, Rijswijk, Netherlands.
(Continued)

*Primary Examiner* — Zeshan Qayyum
(74) *Attorney, Agent, or Firm* — Alston & Bird LLP

(57) ABSTRACT

Various embodiments are directed to processing conversions of digital assets to other digital assets. An example method
(Continued)

includes determining a source exchange rate for a source digital asset and a fiat currency, determining a target exchange rate for a target digital asset and a fiat currency, and generating an aggregated conversion rate for the source digital asset and the target digital asset using the source exchange rate and the target exchange rate. The method further includes executing a digital asset conversion, which includes causing source digital asset units to be debited from a source digital asset user account and causing target digital asset units to be credited to a target digital asset user account, and subsequently executing fiat currency transactions (e.g., settlements) with a first digital asset exchange system associated with the source digital asset and a second digital asset exchange system associated with the target digital asset.

17 Claims, 11 Drawing Sheets

(51) Int. Cl.
   *G06Q 20/36* (2012.01)
   *H04L 67/133* (2022.01)

(58) Field of Classification Search
   CPC .. G06Q 20/02; G06Q 20/065; G06Q 20/4014;
         G06Q 20/405; G06Q 20/42; G06Q 40/04;
         H04L 67/133
   USPC .......................................................... 705/75
   See application file for complete search history.

(56) References Cited

U.S. PATENT DOCUMENTS

| | | | |
|---|---|---|---|
| 10,621,561 | B1 | 4/2020 | Brock et al. |
| 11,138,580 | B1 | 10/2021 | Koch |
| 11,288,660 | B1 | 3/2022 | Kurani |
| 11,810,190 | B2 | 11/2023 | Snyder et al. |
| 2007/0255662 | A1 | 11/2007 | Tumminaro |
| 2009/0119209 | A1 | 5/2009 | Sorensen et al. |
| 2013/0185186 | A1 | 7/2013 | Blackwood |
| 2015/0046241 | A1 | 2/2015 | Salmon et al. |
| 2015/0154572 | A1 | 6/2015 | von NotHaus et al. |
| 2015/0170112 | A1 | 6/2015 | Decastro |
| 2015/0213419 | A1 | 7/2015 | Lyons et al. |
| 2015/0262176 | A1 | 9/2015 | Langschaedel et al. |
| 2015/0332256 | A1 | 11/2015 | Minor |
| 2015/0363769 | A1* | 12/2015 | Ronca .................. G06Q 20/381 705/64 |
| 2016/0203477 | A1 | 7/2016 | Yang et al. |
| 2016/0335628 | A1 | 11/2016 | Weigold |
| 2016/0371771 | A1 | 12/2016 | Serrano et al. |
| 2017/0221053 | A1 | 8/2017 | Goloshchuk |
| 2017/0357966 | A1 | 12/2017 | Chandrasekhar et al. |
| 2019/0034984 | A1 | 1/2019 | Lee et al. |
| 2019/0139033 | A1 | 5/2019 | Ricotta et al. |
| 2019/0220856 | A1 | 7/2019 | Li et al. |
| 2019/0236593 | A1 | 8/2019 | Vorobyev et al. |
| 2019/0236594 | A1 | 8/2019 | Ehrlich-Quinn |
| 2019/0303887 | A1 | 10/2019 | Wright et al. |
| 2019/0303921 | A1 | 10/2019 | Mutter |
| 2019/0303922 | A1 | 10/2019 | Hamasni et al. |
| 2020/0019937 | A1 | 1/2020 | Edwards et al. |
| 2020/0042996 | A1 | 2/2020 | Mayblum et al. |
| 2020/0042998 | A1 | 2/2020 | Mendhi et al. |
| 2020/0175506 | A1* | 6/2020 | Snow .................. G06Q 20/0655 |
| 2020/0195652 | A1 | 6/2020 | Carnahan et al. |
| 2020/0211098 | A1 | 7/2020 | Miyamoto et al. |
| 2020/0265516 | A1 | 8/2020 | Xu |
| 2020/0334668 | A1 | 10/2020 | Nicli et al. |
| 2020/0364686 | A1 | 11/2020 | Millius et al. |
| 2020/0380476 | A1 | 12/2020 | Trudeau et al. |
| 2021/0012420 | A1* | 1/2021 | Balakrishnan ... G06Q 10/06316 |
| 2021/0082044 | A1 | 3/2021 | Sliwka et al. |
| 2021/0119807 | A1 | 4/2021 | Chen et al. |
| 2021/0150586 | A1 | 5/2021 | Tran |
| 2021/0357917 | A1 | 11/2021 | Dalton |
| 2021/0398211 | A1* | 12/2021 | Maathur .............. G06Q 20/401 |
| 2022/0122062 | A1 | 4/2022 | Mayblum et al. |
| 2022/0164815 | A1 | 5/2022 | Petersen et al. |
| 2022/0188780 | A1 | 6/2022 | Cabrera et al. |
| 2022/0188781 | A1 | 6/2022 | El-Bizri |
| 2022/0188812 | A1 | 6/2022 | Petersen et al. |
| 2022/0188917 | A1 | 6/2022 | Petersen et al. |
| 2022/0237597 | A1 | 7/2022 | Petersen et al. |
| 2022/0237598 | A1 | 7/2022 | Cabrera et al. |
| 2022/0237599 | A1 | 7/2022 | Petersen et al. |
| 2024/0095723 | A1 | 3/2024 | Petersen et al. |

FOREIGN PATENT DOCUMENTS

| | | | |
|---|---|---|---|
| WO | WO-2019/222432 A1 | 11/2019 | |
| WO | 2020/049442 A1 | 3/2020 | |

OTHER PUBLICATIONS

International Searching Authority, International Search Report and Written Opinion for International Application No. PCT/US2021/049625, dated Dec. 21, 2021, (16 pages), European Patent Office, Rijswijk, Netherlands.
Dashkevich, Natalia et al. "Blockchain Application for Central Banks: A Systemic Mapping Study," IEEE Access, Jul. 27, 2020, DOI: 10.1109/ACCESS.2020.3012295.
NonFinal Office Action for U.S. Appl. No. 17/378,250, dated Aug. 5, 2022, (40 pages), United States Patent and Trademark Office, US.
Proskuryakov, Alexander et al. "Predictive-Free Methods for Digital Financial Asset Management and delayed Functional-Differential Economic Game Models," Xplore IEEE. 2021 International Conference On Information Technology and Nanotechnology (ITNT), Sep. 20-24, 2021, DOI: 10.1109/ITNT52450.2021.9649433.
International Searching Authority, International Search Report and Written Opinion for International Application No. PCT/US2021/043168, dated Nov. 12, 2021, (15 pages).
International Searching Authority, International Search Report and Written Opinion for International Application No. PCT/US2021/043173, dated Nov. 12, 2021, (17 pages).
International Searching Authority, International Search Report and Written Opinion for International Application No. PCT/US2021/043184, dated Nov. 16, 2021, (17 pages).
International Searching Authority, International Search Report and Written Opinion for International Application No. PCT/US2021/050043, dated Jan. 10, 2022, (16 pages), European Patent Office, Rijswijk, Netherlands.
NonFinal Office Action for U.S. Appl. No. 17/407,962, dated Sep. 21, 2022, (53 pages), United States Patent and Trademark Office, US.
International Searching Authority, International Search Report and Written Opinion for International Application No. PCT/US2021/050135, dated Jan. 3, 2022, (14 pages), European Patent Office, Rijswijk, Netherlands.
International Searching Authority, International Search Report and Written Opinion for International Application No. PCT/US2021/050137, dated Jan. 3, 2022, (14 pages), European Patent Office, Rijswijk, Netherlands.
Final Office Action for U.S. Appl. No. 17/407,962, dated Apr. 25, 2023, (29 pages), United States Patent and Trademark Office, US.
Dashkevich, Natalia et al. "Blockchain Application for Central Banks: A Systemic Mapping Study," in IEEE Access, vol. 8, Jul. 27, 2020 (Year: 2020), pp. 139918-133952, DOI: 10.1109/ACCESS.2020.3012295.
Final Office Action for U.S. Appl. No. 17/378,250, dated Mar. 3, 2023, (20 pages), United States Patent and Trademark Office, US.
NonFinal Office Action for U.S. Appl. No. 17/460,799, dated Mar. 1, 2023, (22 pages), United States Patent and Trademark Office, US.

(56) References Cited

OTHER PUBLICATIONS

Proskuryakov, Alexander et al. "Predictive-Free Methods for Digital Financial Asset Management and Delayed Functional-Differential Economic Game Models," 2021 International Conference on Information Technology and Nontechnology (ITNT), pp. 1-4, Samara, Russian Federation, Xplore IEEE, Date of Conference: Sep. 20-24, 2021 (Year: 2021), DOI: 10.1109/ITNT52450.2021.9649433.

Final Office Action for U.S. Appl. No. 17/460,799, dated Jun. 22, 2023, (12 pages), United States Patent and Trademark Office, US.

NonFinal Office Action for U.S. Appl. No. 17/397,810, dated Aug. 15, 2023, (26 pages), United States Patent and Trademark Office, US.

NonFinal Office Action for U.S. Appl. No. 17/407,962, dated Nov. 14, 2023 (33 pages), United States Patent and Trademark Office, US.

NonFinal Office Action for U.S. Appl. No. 17/460,799, dated Oct. 12, 2023, (23 pages), United States Patent and Trademark Office, US.

Non-Final Rejection Mailed on Mar. 14, 2024 for U.S. Appl. No. 17/378,185, 16 page(s).

Non-Final Rejection Mailed on Mar. 15, 2024 for U.S. Appl. No. 17/397,810, 16 page(s).

Non-Final Rejection Mailed on Mar. 28, 2024 for U.S. Appl. No. 17/460,810, 14 page(s).

Final Rejection Mailed on May 9, 2024 for U.S. Appl. No. 17/460,799, 11 page(s).

Final Rejection Mailed on May 14, 2024 for U.S. Appl. No. 17/407,962, 41 page(s).

\* cited by examiner

EFFICIENT, ACCURATE, AND SECURE PROCESSING OF CONVERSIONS BETWEEN DIGITAL ASSETS

CROSS-REFERENCE TO RELATED APPLICATIONS

This application claims the benefit of U.S. Provisional Patent Application Ser. No. 63/199,244 filed on Dec. 16, 2020, which is incorporated herein by reference in its entirety, including any figures, tables, drawings, and appendices.

TECHNOLOGICAL FIELD

Embodiments of the present disclosure generally relate to transacting, exchanging, transferring, managing, executing transactions for, and/or the like digital assets and fiat currency.

BACKGROUND

Various embodiments of the present disclosure address technical challenges related to exchanging digital assets for different digital assets, managing the processing of such exchanges and transactions, and improving the efficiency of such processing.

BRIEF SUMMARY

In general, embodiments of the present disclosure provide methods, apparatus, systems, computing devices, computing entities, and/or the like for converting units of a first digital asset (e.g., a source digital asset) in a first digital asset user account associated with an end user of a client device for units of a second digital asset (e.g., a target digital asset). The digital asset units of the second digital asset (e.g., a target digital asset) may be credited, transferred to, deposited, and/or the like in a second digital asset user account associated with the end user. For example, the end user may be associated with both a first digital asset user account for the first digital asset and a second digital asset user account for the second digital asset. As such, the conversion between digital assets may span across at least two different digital asset user accounts. The conversion of units of a first digital asset to units of a second digital asset may be referred to a source-target conversion, a source-target digital asset conversion of a digital asset, a digital asset conversion, a conversion, and/or similar terms used herein interchangeably.

From the perspective of the end user, the execution of the conversion involves a debit or reduction of a number of source digital asset units from a first digital asset user account and the credit or increase of a number of target digital asset units in a second digital asset user account. Beyond the end user's perspective however, the execution of the conversion involves at least two main actions: (i) the conversion of a number of source digital asset units to fiat currency, and (ii) the conversion of a fiat currency to a number of target digital asset units. Thus, various embodiments provide a unique and advantageous capability to facilitate the conversion of a digital asset to any other digital asset, whereas previously an end user may have been limited to exchanging a digital asset for fiat currency, physical goods or services, and/or a select few digital assets.

Various embodiments of the present disclosure provide technical advantages by enabling digital asset exchange system to configure and establish various rate-specific thresholds and/or limits associated with the exchange rate of a digital asset to maintain control over economic dynamics (e.g., supply, demand) of a digital asset. As various embodiments enable the conversion of a first digital asset (e.g., a source digital asset) to a second digital asset (e.g., a target digital asset)—each digital asset having its own exchange rate—various embodiments generate a reconciled and/or optimized conversion rate, or an aggregated conversion rate, satisfying exchange rates for each digital asset. As such, various embodiments advantageously streamline and condense information for end users.

Various embodiments provide further technical advantages by enabling the intelligent determination of exchange rates of digital assets based at least in part on end user and cohort behavior. In various embodiments, conversion behavior analytics may be aggregated, generated, and provided to a digital asset exchange system, and the digital asset exchange system may use the conversion behavior analytics to determine an exchange rate, rate-specific thresholds or limits, and/or conversion thresholds or limits for a digital asset. Various embodiments also provide technical advantages by obtaining exchange rates and/or causing the crediting or debiting of digital assets using an identifier token unique to the end user and recognizable by multiple digital asset exchange systems. Because the identifier token is widely recognizable and applicable (e.g., a GUID, a UIUD, a federated identifier token), memory storage and processing resources may be conserved with individual identifiers for multiple accounts associated with the end user being unnecessary. Further still, various embodiments of the present disclosure provide technical advantages by improving processing efficiency and speed of source-target digital asset conversions by causing the end user to receive units of the target digital asset in real-time.

In various embodiments, an account management system receives a conversion rate request originating from a client device and determines an aggregated conversion rate between a source digital asset and a target digital asset to provide to the client device. Specifically, the account management system determines the aggregated conversion rate based at least in part on an exchange rate for each of the source digital asset and the target digital asset (an exchange rate with respect to a fiat currency). Each exchange rate for a digital asset may be received via one or more application programming interfaces (APIs). Each exchange rate may also be associated with various established rate-specific thresholds or limits, and the account management system determines an aggregated conversion rate satisfying each of the rate-specific thresholds or limits. In various embodiments, the account management system may repeatedly determine a new aggregated conversion rate based at least in part on an automated timing trigger for one or more configurable time periods and update an end user with the new aggregated conversion rate.

In various embodiments, the account management system initiates the conversion in response to receiving a conversion execution request originating from the client device, the conversion execution request representing an approval of the aggregated conversion rate by the end user. The account management system may first determine the number of digital asset units of the source digital asset (or source digital asset units) and the number of digital asset units of the target digital asset (or target digital asset units) involved in the conversion, which may be selected or indicated by the end user via the client device and/or based at least in part on the aggregated conversion rate. In various embodiments, the account management system may evaluate the conversion with respect to conversion thresholds and/or limits established by the digital asset exchange system.

In various embodiments, the account management system may execute the conversion by causing the debit of the determined number of source digital asset units from a first digital asset user account associated with the end user of the client device. In various embodiments, the account management system further executes the conversion by causing the credit of the determined number of target digital asset units to a second digital asset user account associated with the end user of the client device. Thus, various embodiments provide technical advantages by efficiently and rapidly executing the conversion of a source digital asset to a target digital asset in which the end user promptly receives the target digital asset units.

In various embodiments, the account management system may execute a fiat currency transaction with a first digital asset exchange system, in which the account management system is credited in exchange for the debiting of the source digital asset units. In various embodiments, the account management system then executes a fiat currency transaction with a second digital asset exchange system, in which the account management system is debited in exchange for the crediting of the target digital asset units. In some instances, the amount of fiat currency first credited and then debited is substantially the same. In various embodiments, the first and second fiat currency transactions may involve the transfer of fiat currency units corresponding to a plurality of conversions requested by and/or executed for a plurality of end users. As such, various embodiments provide technical advantages by reducing the number of transactions to execute and process by a digital asset exchange system for a plurality of digital asset conversions.

In accordance with one aspect, a computer-implemented method is provided. The method includes determining a first source exchange rate for a source digital asset and a fiat currency. The first source exchange rate is determined based at least in part on: generating and transmitting a first source exchange rate application programming interface (API) request, the first source exchange rate API request indicating a source digital asset and associated with a source digital asset user account identifiable by an identifier token associated with an end user, and receiving a first source exchange rate API response including the first source exchange rate for the source digital asset and the fiat currency. The method further includes determining a first target exchange rate for a target digital asset and a fiat currency. The first target exchange rate is determined based at least in part on: generating and transmitting a first target exchange rate API request, the first target exchange rate API request indicating a target digital asset and associated with a target digital asset user account identifiable by the identifier token associated with the end user, and receiving a first target exchange rate API response comprising the first target exchange rate for the target digital asset and the fiat currency. The method further includes generating a first aggregated conversion rate for the source digital asset and the target digital asset based at least in part on the first source exchange rate and the first target exchange rate and providing the first aggregated conversion rate for display via a client device. The first aggregated conversion rate is provided in response to a first digital asset conversion request indicating the source digital asset and the target digital asset and received at a first timepoint.

The method further includes, responsive to determining that a first configurable time period has elapsed: generating a second aggregated conversion rate based at least in part on transmitting a second source exchange API request and a second target exchange API request and receiving a second source exchange rate API response comprising a second source exchange rate and a second target exchange rate API response comprising a second target exchange rate, the second aggregated conversion rate being based at least in part on the second source exchange rate and the second target exchange rate, and providing the second aggregated conversion rate for display via the client device. The method further includes receiving a second digital asset conversion request. The second digital asset conversion request is (i) received at a second timepoint, (ii) associated with both a source digital asset user account and a target digital asset user account each identifiable by the identifier token associated with the end user, and (iii) indicates a number of source digital asset units.

The method further includes executing a digital asset conversion for the second digital asset conversion request within a second configurable time period. Executing the digital asset conversion includes causing the number of source digital asset units to be debited from the source digital asset user account and causing a number of target digital asset units to be credited to the target digital asset user account. The method further includes dynamically providing a notification of execution of the digital asset conversion via the client device and updating a first account balance data object associated with the source digital asset user account and a second account balance data object associated with the target digital asset user account based at least in part on the digital asset conversion. The method further includes, subsequent to executing the digital asset conversion: executing a first fiat currency transaction with a first digital asset exchange system associated with the source digital asset, and executing a second fiat currency transaction with a second digital asset exchange system associated with the target digital asset.

In accordance with another aspect, a system is provided. The system includes one or more memory storage areas and one or more processors. The system is configured for determining a first source exchange rate for a source digital asset and a fiat currency. The first source exchange rate is determined based at least in part on: generating and transmitting a first source exchange rate application programming interface (API) request, the first source exchange rate API request indicating a source digital asset and associated with a source digital asset user account identifiable by an identifier token associated with an end user, and receiving a first source exchange rate API response including the first source exchange rate for the source digital asset and the fiat currency. The system is further configured for determining a first target exchange rate for a target digital asset and a fiat currency. The first target exchange rate is determined based at least in part on: generating and transmitting a first target exchange rate API request, the first target exchange rate API request indicating a target digital asset and associated with a target digital asset user account identifiable by the identifier token associated with the end user, and receiving a first target exchange rate API response comprising the first target exchange rate for the target digital asset and the fiat currency. The system is further configured for generating a first aggregated conversion rate for the source digital asset and the target digital asset based at least in part on the first source exchange rate and the first target exchange rate and providing the first aggregated conversion rate for display via a client device. The first aggregated conversion rate is provided in response to a first digital asset conversion request indicating the source digital asset and the target digital asset and received at a first timepoint.

The system is further configured for, responsive to determining that a first configurable time period has elapsed: generating a second aggregated conversion rate based at least in part on transmitting a second source exchange API request and a second target exchange API request and receiving a second source exchange rate API response comprising a second source exchange rate and a second target exchange rate API response comprising a second target exchange rate, the second aggregated conversion rate being based at least in part on the second source exchange rate and the second target exchange rate, and providing the second aggregated conversion rate for display via the client device. The system is further configured for receiving a second digital asset conversion request. The second digital asset conversion request is (i) received at a second timepoint, (ii) associated with both a source digital asset user account and a target digital asset user account each identifiable by the identifier token associated with the end user, and (iii) indicates a number of source digital asset units.

The system is further configured for executing a digital asset conversion for the second digital asset conversion request within a second configurable time period. Executing the digital asset conversion includes causing the number of source digital asset units to be debited from the source digital asset user account and causing a number of target digital asset units to be credited to the target digital asset user account. The system is further configured for dynamically providing a notification of execution of the digital asset conversion via the client device and updating a first account balance data object associated with the source digital asset user account and a second account balance data object associated with the target digital asset user account based at least in part on the digital asset conversion. The system is further configured for, subsequent to executing the digital asset conversion: executing a first fiat currency transaction with a first digital asset exchange system associated with the source digital asset, and executing a second fiat currency transaction with a second digital asset exchange system associated with the target digital asset.

In accordance with yet another aspect, a computer program product is provided. The computer program product includes at least one non-transitory computer-readable storage medium having computer-readable program code portions stored therein. The computer-readable program code portions include executable portions configured for determining a first source exchange rate for a source digital asset and a fiat currency. The first source exchange rate is determined based at least in part on: generating and transmitting a first source exchange rate application programming interface (API) request, the first source exchange rate API request indicating a source digital asset and associated with a source digital asset user account identifiable by an identifier token associated with an end user, and receiving a first source exchange rate API response including the first source exchange rate for the source digital asset and the fiat currency. The computer-readable program code portions include further executable portions configured for determining a first target exchange rate for a target digital asset and a fiat currency. The first target exchange rate is determined based at least in part on: generating and transmitting a first target exchange rate API request, the first target exchange rate API request indicating a target digital asset and associated with a target digital asset user account identifiable by the identifier token associated with the end user, and receiving a first target exchange rate API response comprising the first target exchange rate for the target digital asset and the fiat currency. The computer-readable program code portions include further executable portions configured for generating a first aggregated conversion rate for the source digital asset and the target digital asset based at least in part on the first source exchange rate and the first target exchange rate and providing the first aggregated conversion rate for display via a client device. The first aggregated conversion rate is provided in response to a first digital asset conversion request indicating the source digital asset and the target digital asset and received at a first timepoint.

The computer-readable program code portions include further executable portions configured for, responsive to determining that a first configurable time period has elapsed: generating a second aggregated conversion rate based at least in part on transmitting a second source exchange API request and a second target exchange API request and receiving a second source exchange rate API response comprising a second source exchange rate and a second target exchange rate API response comprising a second target exchange rate, the second aggregated conversion rate being based at least in part on the second source exchange rate and the second target exchange rate, and providing the second aggregated conversion rate for display via the client device. The computer-readable program code portions include further executable portions configured for receiving a second digital asset conversion request. The second digital asset conversion request is (i) received at a second timepoint, (ii) associated with both a source digital asset user account and a target digital asset user account each identifiable by the identifier token associated with the end user, and (iii) indicates a number of source digital asset units.

The computer-readable program code portions include further executable portions configured for executing a digital asset conversion for the second digital asset conversion request within a second configurable time period. Executing the digital asset conversion includes causing the number of source digital asset units to be debited from the source digital asset user account and causing a number of target digital asset units to be credited to the target digital asset user account. The computer-readable program code portions include further executable portions configured for dynamically providing a notification of execution of the digital asset conversion via the client device and updating a first account balance data object associated with the source digital asset user account and a second account balance data object associated with the target digital asset user account based at least in part on the digital asset conversion. The computer-readable program code portions include further executable portions configured for, subsequent to executing the digital asset conversion: executing a first fiat currency transaction with a first digital asset exchange system associated with the source digital asset, and executing a second fiat currency transaction with a second digital asset exchange system associated with the target digital asset.

BRIEF DESCRIPTION OF THE DRAWING(S)

Having thus described the present disclosure in general terms, reference will now be made to the accompanying drawings, which are not necessarily drawn to scale, and wherein:

Figure 1:
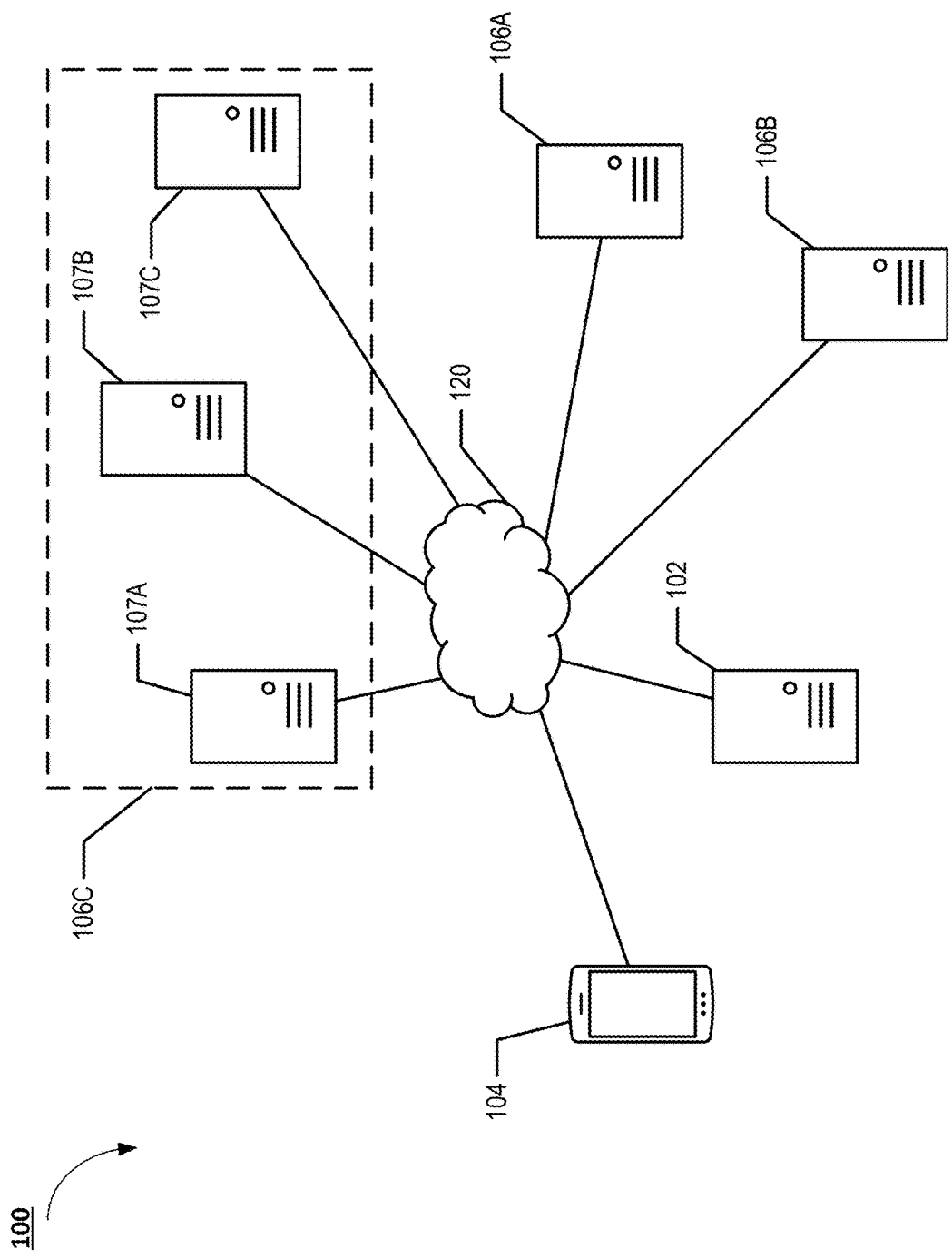
FIG. 1 is an exemplary diagram of a system architecture, in accordance with various embodiments of the present disclosure.

FIGS. 4A-D provide example process flows for converting a source digital asset to a target digital asset, in accordance with various embodiments of the present disclosure; and FIGS. 5-8 provide example interfaces for converting a source digital asset to a target digital asset, in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. General Overview and Technical Advantages

Various embodiments of the present disclosure are directed to the conversion between different digital assets and the execution thereof. In various embodiments, an account management system may be configured to execute the conversion between digital assets for an end user of a client device and/or responsive to a request received originating from a client device. In various embodiments, the execution of the conversion of a source digital asset to a target digital asset comprises the debiting of a number of units of a source digital asset (or a number of source digital asset units) from a first digital asset user account (e.g., a source digital asset user account) and the crediting of a number of units of a target digital asset (or a number of target digital asset units) to a second digital asset user account (e.g., a target digital asset user account). In various embodiments, the end user is presented with an aggregated conversion rate between the source digital asset and the target digital asset, the aggregated conversion rate being generated based at least in part on exchange rates with respect to fiat currency for each of the source digital asset and the target digital asset. In various embodiments, the conversion between a source digital asset and a target digital asset for an end user is executed by the account management system and does not involve other end users. Thus, various embodiments advantageously enable the conversion between a source digital asset and a target digital asset for an end user over existing methods and systems that exchange or transfer digital assets between multiple end users.

Various embodiments advantageously enable an entity associated with a digital asset exchange system to manage or manipulate a value of a corresponding digital asset. In various embodiments, an entity associated with a digital asset exchange system may establish rate-specific thresholds and/or limits associated with an exchange rate for a digital asset. For example, an entity associated with the digital asset exchange system may establish that a maximum of ten-thousand digital asset units may be converted at an exchange rate of one-hundred digital asset units to one fiat currency unit. With conversions between multiple digital assets involving multiple of such rate-specific thresholds and/or limits, an account management system may generate, optimize, reconcile, and/or the like an aggregated conversion rate between two or more digital assets satisfying multiple rate-specific thresholds and/or limits. Additional technical advantages exist here, such as an end user being provided with an aggregated conversion rate between digital assets instead of multiple exchange rates with respect to fiat currency (as the end user is interested mainly of the conversion between digital assets without fiat currency). Various embodiments also enable an entity associated with a digital asset exchange system to establish various conversion thresholds and/or limits to be evaluated upon execution of a conversion between digital assets. Such conversion thresholds and/or limits may bar or preclude a number of digital assets to be converted by one end user, by a cohort of end users, by various end users within a specific and configurable time period, and/or the like. An account management system may then evaluate various conversions requested by various end users with respect to such conversion thresholds and/or limits, and accordingly adjust, modify, and/or cancel some conversions based at least in part on the conversion thresholds and/or limits. Similarly, the account management system and/or a digital asset exchange system may determine whether a significant change in digital asset unit supply or distribution for a corresponding digital asset is likely to occur, such a significant change having the potential to cause a fiat currency shortage or deficit of the entity associated with a digital asset exchange system. As such, subsequent conversions may be adjusted, modified, and/or cancelled according to a predicted significant change in digital asset unit supply or distribution.

Various embodiments of the present disclosure provide further technical advantages by determining, aggregating, generating, and/or the like conversion behavior analytics data objects for an end user and/or a cohort, which may be used by the account management system to obtain an exchange rate of a digital asset. For example, the account management system may transmit a request for an exchange rate which may comprise such conversion behavior analytic data objects. In such an example, a digital asset exchange system may generate or determine an exchange rate for a digital asset which may or may not be based at least in part on the conversion behavior analytic data objects, and the account management system may receive the exchange rate originating from the digital asset exchange system. Thus, various embodiments enable a digital asset exchange system to make intelligent decisions for exchange rates for a digital asset to thereby manage or manipulate a value of the digital asset.

In some instances, a digital asset exchange system may establish a generalized exchange rate for a digital asset, and the account management system may provide an identifier token associated with the end user and/or a conversion behavior data object in a query whether the digital asset exchange system will generate a unique exchange rate for the digital asset for the end user specifically or whether the generalized exchange rate should be provided and used. In various embodiments, the account management system may receive updates (e.g., via an API) originating from the digital asset exchange system describing changes to the generalized exchange rate. In other embodiments, the account management system may otherwise monitor for changes made or to be made to a generalized exchange rate.

In various embodiments, the account management system enables an end user to request the conversion between different digital assets and may accordingly be configured to communicate with different digital asset exchange systems corresponding to different digital assets (e.g., different digital asset exchange systems may be responsible for the debiting and the crediting of different digital assets). In various embodiments, the account management system may establish, manage, generate, broadcast, and/or the like a unique or federated identifier token associated with an end user and use the identifier token associated with the end user in communications with different digital asset exchange systems for conversions requested by the end user. The identifier token may be mapped to, may be linked with, may reference, and/or the like one or more digital asset user accounts managed, custodied, hosted, and/or the like by digital asset exchange systems. For example, the identifier token may be configured to, when received by a digital asset exchange system, cause the digital asset exchange system to identify and locate one or more digital asset user accounts associated with (e.g., owned by) the end user associated with the identifier token. The identifier token may map to multiple different digital asset user accounts across multiple different digital asset exchange systems. Thus, the digital asset exchange systems may use the identifier token associated with the end user to identify corresponding digital asset user accounts for the debiting and/or crediting of digital asset units. As such, the account management system advantageously requires less information associated with the end user to communicate with different digital asset exchange systems, in contrast with existing systems that may require unique information (e.g., credentials, identifiers) associated with the end user for each individual digital asset exchange system.

In various embodiments, the account management system is configured to continuously and periodically determine, generate, use, and/or the like an aggregated conversion rate between the source digital asset and the target digital asset based at least in part on one or more configurable time periods. For example, the account management system may be configured to generate and provide a new aggregated conversion rate to a client device responsive to an automated timing trigger for a configurable refresh time period. The account management system may additionally or alternatively obtain a new aggregated conversion rate for the execution of a conversion responsive to an automated timing trigger for a configurable execution time period. As such, various embodiments of the present disclosure provide technical advantages by (i) providing current and up-to-date aggregated conversion rates based at least in part on the configurable refresh time period to an end user such that an end user may initiate and request a well-informed conversion between digital assets, and by (ii) using current and up-to-date aggregated conversion rates based at least in part on the configurable execution time period to execute accurate conversions between digital assets in cases of digital asset value volatility.

Further, various embodiments provide technical advantages by processing conversions of digital assets to fiat currency in a rapid manner. That is, a user requesting a conversion of a digital asset to a fiat currency may obtain fiat currency units within seconds or minutes of the request. Such rapid processing is particular advantageous over existing methods or systems in which a user obtains fiat currency in exchange for digital assets after hours or days.

Various embodiments of the present disclosure further still provide technical advantages by reducing the number of transactions requiring processing and by reducing network traffic and bandwidth. During a conversion between digital assets, each of the debiting of source digital asset units and the crediting of target digital asset units involves fiat currency. For example, a first digital asset exchange system may debit source digital asset units and provide (e.g., credit to the entity or system from which the source digital asset units were debited) fiat currency units in exchange (based at least in part on an exchange rate for the source digital asset with respect to fiat currency), while a second digital asset exchange system may credit target digital asset units and receive (e.g., be credited with) fiat currency units. As the account management system manages, receives requests for, and executes multiple conversions between digital assets, the account management system may request to be credited with fiat currency units in exchange for multiple debits of source digital asset units to multiple different user accounts over multiple conversions in a settlement request transmitted to the first digital asset exchange system. Likewise, the account management system may indicate via a settlement request transmitted to the second digital asset exchange system that fiat currency units transferred in one transfer to the second digital asset exchange system is in exchange for multiple credits of target digital asset units over multiple conversions possibly to multiple different user accounts. In some embodiments, the transfer of fiat currency units to the second digital asset exchange system may be responsive to receiving a settlement request originating from the second digital asset exchange system. Accordingly, multiple debits of source digital asset units and multiple credits of target digital asset units from multiple executed conversions may be settled by two fiat currency transactions (one with a first digital asset exchange system and another with a second digital asset exchange system), improving transaction efficiency, and reducing the number of communications between the account managing system and various digital asset exchange systems.

II. Exemplary Definitions

The term "digital asset" may generally refer to any data entity that is perceived to hold value. For example, a digital asset may be a cryptoasset or cryptocurrency (e.g., a cryptocurrency digital asset), a liability digital asset such as loyalty points or reward points, an in-game asset or ecosystem-specific asset, and/or the like. For such digital assets, the supply of the digital asset may include multiple digital asset units. A digital asset unit of a digital asset may be understood as a quantification or basis of the digital asset, such as an individual Bitcoin (BTC), one corporate loyalty point, and/or the like. A digital asset may be quantified, managed, transacted, and/or the like based at least in part on full and/or fractional units. For example, a digital asset transaction may involve 1 BTC unit, 2 BTC units, 100 BTC units, and/or the like (full units), while another digital asset transaction may involve 0.4 BTC units, 1.5 BTC units, 0.0150 BTC units, and/or the like (fractional units). A digital asset may also be a single-unit digital asset, such as a non-fungible token (NFT) or an ownership token. A digital asset is associated with value and may be used to purchase goods and services or be exchanged for fiat currency. By extension, a digital asset may be exchanged for another digital asset of equivalent value, or a number of digital asset units of a first digital asset may be exchanged for a number of digital asset units of a second digital asset, using fiat currency as an equivalence basis of value. A digital asset may be a strictly digital construct and may not exist in a physical state.

The term "fiat currency" may refer to a currency that is not necessarily related to or backed by a physical commodity. A fiat currency may be centrally managed and distributed by a central entity. Examples of fiat currencies may include U.S. dollars (USD, $), European Union (EU) euros, Chinese yen, English pounds, and/or the like that are managed and distributed by respective governments. The central entity managing a fiat currency may have the authority to increase and/or decrease the supply of a fiat currency. A fiat currency has inherent transactional value, which may be based at least in part on a relationship between the supply of the fiat currency and the demand of the fiat currency. Thus, the value of fiat currency may be managed by a central entity. The value of fiat currency may be used as a reference for evaluating a variable value of a digital asset. A fiat currency may be quantified by fiat currency units. For example, one unit of a U.S. dollar fiat currency may be understood as a single dollar or a single cent. Value of various digital assets and other purchased goods or services may be described by a number of fiat currency units.

The term "exchange rate" may describe a value (e.g., a transactional value) of a digital asset. Specifically, an exchange rate for a digital asset may describe the value of a digital asset with respect to a fiat currency. For example, an exchange rate for a liability digital asset may indicate that one unit of the liability digital asset (e.g., one reward point) may be equal in value with a number of fiat currency units. As another example, an exchange rate for a cryptocurrency digital asset may indicate that one unit of the cryptocurrency digital asset may be equal in value with a fractional number of a fiat currency unit. An exchange rate may be historical, indicative, current, and/or real-time. In one example, an exchange rate of a historical or indicative nature may describe the variable value of a digital asset (e.g., with respect to a fiat currency) over a previous or past time period. Accordingly, exchange rates may be associated with a timepoint or be labelled with timestamps. Similarly, an exchange rate of a current or real-time nature may describe the value of a digital asset (e.g., with respect to a fiat currency) at a present moment in time. As such, exchange rates may be refreshed or updated continuously and periodically so as to accurately describe the value of a digital asset at a present moment in time.

The term "conversion rate" may describe the value (e.g., a transactional value) of a digital asset. Specifically, a conversion rate for a digital asset may describe the value of a digital asset with respect to another digital asset. A conversion rate for a first digital asset with respect to a second digital asset may be referred herein as a conversion rate between a first digital asset and a second digital asset. Similar to an exchange rate, a conversion rate may be full or fractional. For example, a conversion rate may indicate that one unit of a first digital asset is equal in value with a full number of units of a second digital asset, while another conversion rate may indicate that one unit of a first digital asset is equal in value with a fractional number of units of a second digital asset. An aggregated conversion rate may be generated or determined based at least in part on multiple exchange rates. For example, a fiat currency may be used as a basis, reference, or intermediary for comparing the value of a first digital asset with respect to a second digital asset. Similar to an exchange rate, a conversion rate may be historical, indicative, current, and/or real-time and may be refreshed or updated continuously and periodically so as to accurately describe the value of a digital asset with respect to another digital asset at a present moment in time.

The term "identifier token" may refer to a data entity associated with an end user of a client device and may be configured to identify the end user. As used and described herein, an identifier token may be a unique identifier token associated with the end user, and thus, each end user that may communicate with an account management system may be associated and assigned with a unique identifier token. An identifier token may also be a federated, global, universal, and/or the like identifier token configured to identify the same end user in various systems. For example, the identifier token may be used to identify the end user in an account management system, and the same identifier token may be used to identify the end user in various different digital asset exchange systems. The identifier token may include various identifying information for an end user, such as name, birthdate, Social Security Number, and/or the like. The identifier token may be and/or comprise a globally unique identifier (GUID), a universally unique identifier (UUID), a hash or cryptographic value of user information or credentials, and/or the like.

The term "account balance data object" may refer to a data entity configured to describe at least a number of units stored in, associated with, and/or linked to an account. For example, an account balance data object for a fiat currency account (e.g., a fiat currency user account) may describe the number of fiat currency units associated with the fiat currency account. Likewise, an account balance data object for a digital asset account (e.g., a digital asset user account) may describe the number of digital asset units of a digital asset associated with the digital asset account. In some instances, an account balance data object may be a nested account balance data object; that is, an account balance data object associated with a particular digital asset may comprise and/or be otherwise associated with one or more other account balance data objects also associated with the same particular digital asset. An account balance data object comprising one or more nested account balance data objects each corresponding to a user account may indicate, describe, and/or the like a total number of units associated with all of the corresponding user accounts. An account balance data object may comprise additional information for a corresponding account, such as global or account-specific account identifiers, historical balance data, owner entity credentials, and/or the like. Thus, when any account is referenced herein, one or more account balance data objects may be used to record transactions, conversions, transfers, and/or the like that may cause changes (e.g., an increase, a decrease) to the number of digital asset units associated with an account. Such an account balance data object may indicate or describe entities involved in a transaction, conversion, transfer, and/or the like, entities associated with a corresponding account, fiat currencies, fiat currency units, a digital asset, a cost basis, an exchange rate, a conversion rate, timestamps, and/or the like.

The term "conversion behavior cohort" may refer to a plurality of end users that are each similar in some aspect to others of the plurality. The conversion behavior cohort may be associated with a data entity configured to identity and/or describe such plurality of end users. Various information related to each end user (e.g., name, birthdate, Social Security number, permanent address, account identifiers) may then be stored within a conversion behavior cohort. Various aspects for grouping end users in a conversion behavior cohort may include demographic information (e.g., age, location) and/or other information associated with the end user, conversion and/or transaction behavior, account information, and/or the like. For example, a first conversion behavior cohort may include end users who have historically never requested a digital asset conversion, a second conversion behavior cohort may include end users who have historically only requested a digital asset conversion for certain exchange rates, and a third conversion behavior cohort may include end users who have historically requested digital asset conversions in a liberal manner. As another example, a first conversion behavior cohort may include end users who own digital asset user accounts of a first tier, status, and/or the like, and a second conversion behavior cohort may include end users who own digital asset user accounts of a second tier, status, and/or the like. A conversion behavior cohort may identify end users based at least in part on an individual aspect or any combination of aspects.

The term "conversion behavior analytics data object" may refer to a data entity configured to describe conversion and/or transaction behavior of an end user and/or a conversion behavior cohort. For example, a conversion behavior analytics data object may indicate a popular exchange rate at which a high number of digital asset conversions were requested and executed. A conversion behavior analytics data object may also include predictive analytics that may indicate a likelihood of an end user and/or a conversion behavior cohort requesting a digital asset conversion at a particular exchange rate. Thus, a conversion behavior analytics data object may be generated at least in part on a predictive model, optimization model, classification model, neural network model, supervised or unsupervised machine learning model, and/or the like configured to generate predictive analytics.

III. Computer Program Products, Methods, and Computing Entities

Embodiments of the present disclosure may be implemented in various ways, including computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 provides an illustration of an architecture 100 that can be used in conjunction with various embodiments of the present disclosure. As shown in FIG. 1, the architecture 100 may comprise one or more account management systems 102, one or more client devices 104, one or more digital asset exchange systems 106, one or more networks 120, and/or the like. In various embodiments, an account management system 102 is configured to communicate with a plurality of client devices 104 and execute conversions between digital assets (e.g., converting a first/source digital asset to a second/target digital asset) for a plurality of end users associated with the plurality of client devices 104. In various embodiments, an account management system 102 may communicate with one or more digital asset exchange systems 106 for and/or during the execution of a conversion between digital assets for an end user of a client device 104. For example, an account management system 102 may communicate with one digital asset exchange system 106 for both the debiting of source digital asset units and the crediting of target digital asset units. As another example, an account management system 102 may communicate with a first digital asset exchange system 106A for the debiting of source digital asset units and may communicate with a second digital asset exchange system 106B for the crediting of target digital asset units.

As shown in FIG. 1, a digital asset exchange system 106 (e.g., 106C) may be and/or comprise a distributed ledger computing platform comprising a plurality of node computing entities 107 (e.g., 107A, 107B, 107C). For example, in an example embodiment, a digital asset exchange system 106 comprises a plurality of node computing entities 107 in communication with one another via a network 120 and each storing copies of a distributed ledger (e.g., a blockchain) for a digital asset (e.g., a cryptocurrency digital asset). Although not explicitly illustrated, the account management system 102 may be a node computing entity 107 of a digital asset exchange system 106 to enable the execution of the conversion of a cryptocurrency digital asset to other digital assets and/or fiat currency. Each node computing entity 107 may be configured to commit and retrieve portions of the distributed ledger (e.g., distributed ledger entries, records, blocks, and/or the like). A node computing entity 107 may be a full node computing entity that stores the entirety of a distributed ledger (e.g., a blockchain), a mining node computing entity that maintains the distributed ledger (e.g., a blockchain) by publishing updated records, entries, blocks and/or the like while also storing the entirety of the distributed ledger, a lightweight node computing entity that does not store the entirety of the distributed ledger (e.g., a blockchain), and/or the like. Various node computing entities 107 may be configured for providing events, consensus requests, and/or the like; performing consensus processing; storing a copy of a distributed ledger; and/or the like.

Each of the components of the architecture 100 may be in electronic communication with, for example, one another over the same or different wireless or wired networks 120 including, for example, a wired or wireless Personal Area Network (PAN), Local Area Network (LAN), Metropolitan Area Network (MAN), Wide Area Network (WAN), or the like. In some embodiments, the plurality of node computing entities 107 of a digital asset exchange system 106 may be in electronic communication with one another over a different wireless or wired network 120 than the account management system 102 and/or the client device 104. While FIG. 1 illustrates certain systems as separate, standalone entities, the various embodiments are not limited to this particular architecture.

a. Exemplary Account Management System

In an example embodiment, an account management system 102 may be a computing entity configured for managing and executing conversions between digital assets (e.g., converting a first/source digital asset to a second/target digital asset) for various end users of a plurality of client devices 104. For the execution of such conversions, an account management system 102 may debit and/or cause the debiting of a number of source digital asset units from a first digital asset user account associated with the end user and may credit and/or cause the crediting of a number of target digital asset units to a second digital asset user account associated with the end user. Meanwhile, an account management system 102 may manage a plurality of requests for conversions originating from a plurality of client devices 104, which may be received by the account management system 102 at substantially the same time. In various embodiments, the account management system 102 may store and/or have access to a plurality of account balance data objects which may each indicate a historical account activity (e.g., via transaction record data objects each corresponding to an executed conversion). As such, the account management system 102 may maintain a complete record of all digital asset conversions requested and/or executed and may be able to search and find specific digital asset conversions. Each account balance data object stored by or accessible to the account management system 102 may be associated with a particular digital asset and comprise nested account balance data objects also associated with the same particular digital asset and corresponding to a digital asset user account.

In various embodiments, an account management system 102 may be operated by one or more various entities to convert units of a first/source digital asset to units of a second/target digital asset for various end users. For example, an account management system 102 may be operated by banking institution entities, digital asset exchange entities, stock exchange entities, trading platform entities, and/or the like. In various embodiments, an account management system 102 may be operated by a single such entity, while in other embodiments, an account management system 102 may host and/or be operated by multiple such entities, each managing conversions between digital assets for various client devices 104.

Figure 2:
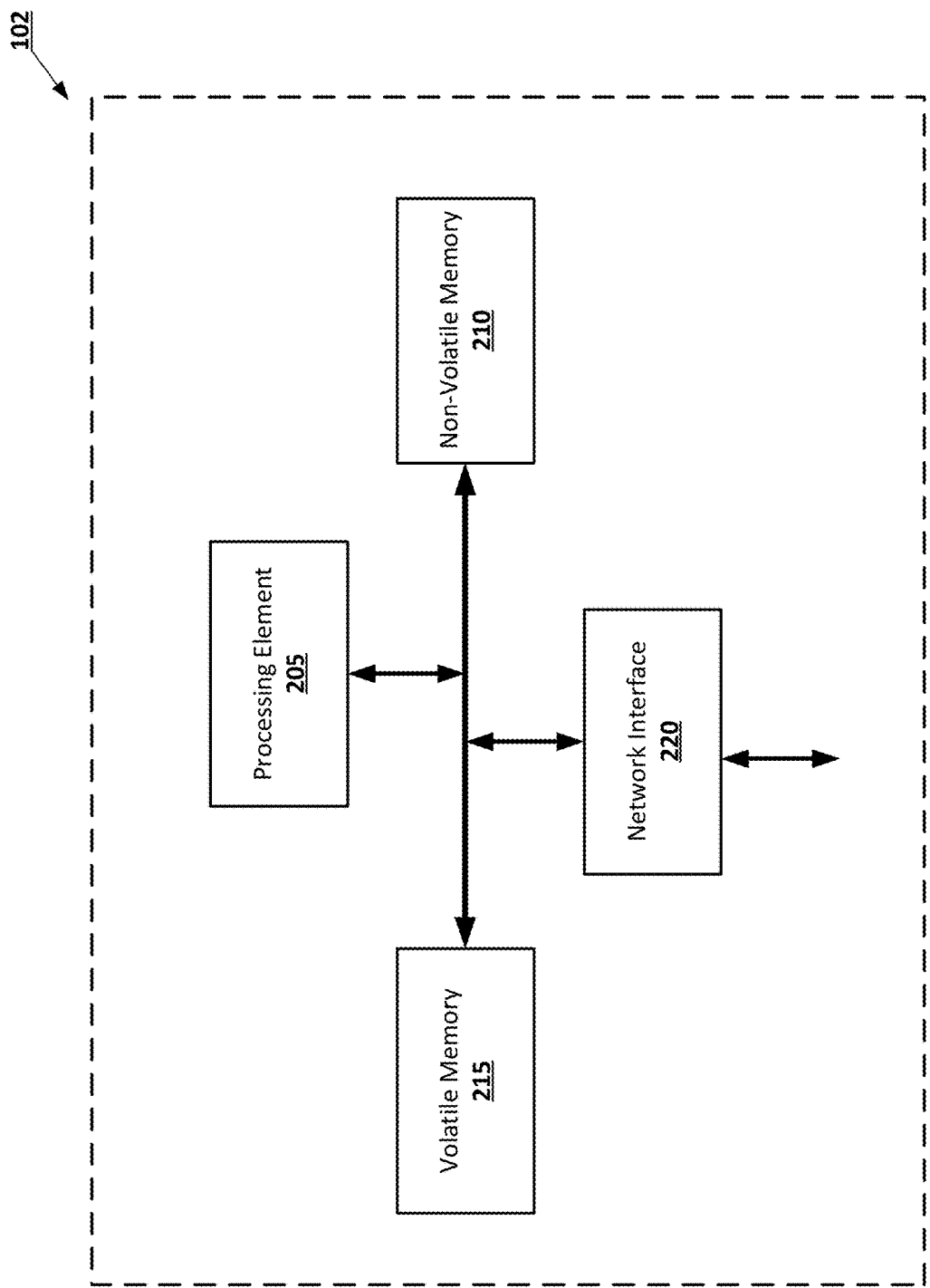
FIG. 2 is an exemplary schematic of an account management system, in accordance with various embodiments of the present disclosure.

FIG. 2 illustrates a schematic of an example account management system 102, according to one embodiment of the present disclosure. As shown in FIG. 2, in one embodiment, the account management system 102 may include, or be in communication with, one or more processing elements 205 (also referred to as processors, processing circuitry, and/or similar terms used herein interchangeably) that communicate with other elements within the account management system 102 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the account management system 102 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the account management system 102 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the step/operation of the account management system 102 with the assistance of the processing element 205 and operating system.

As indicated, in one embodiment, the account management system 102 may also include one or more network interfaces 220 for communicating with various computing entities (e.g., one or more client devices 104, one or more digital asset exchange systems 106), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the account management system 102 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the account management system 102 may include, or be in communication with, one or more input elements, such as a keyboard input, a mouse input, a touch screen/display input, motion input, movement input, audio input, pointing device input, joystick input, keypad input, and/or the like. The account management system 102 may also include, or be in communication with, one or more output elements (not shown), such as audio output, video output, screen/display output, motion output, movement output, and/or the like.

As will be appreciated, one or more of the components of the account management system 102 may be located remotely from other components of the account management system 102, such as in a distributed system architecture. Furthermore, one or more of the components of the account management system 102 may be combined. Additional components performing functions, operations, methods, processes, and/or the like described herein may be included in the account management system 102. Thus, the account management system 102 may be adapted to accommodate a variety of needs and circumstances.

b. Exemplary Client Device

Figure 3:
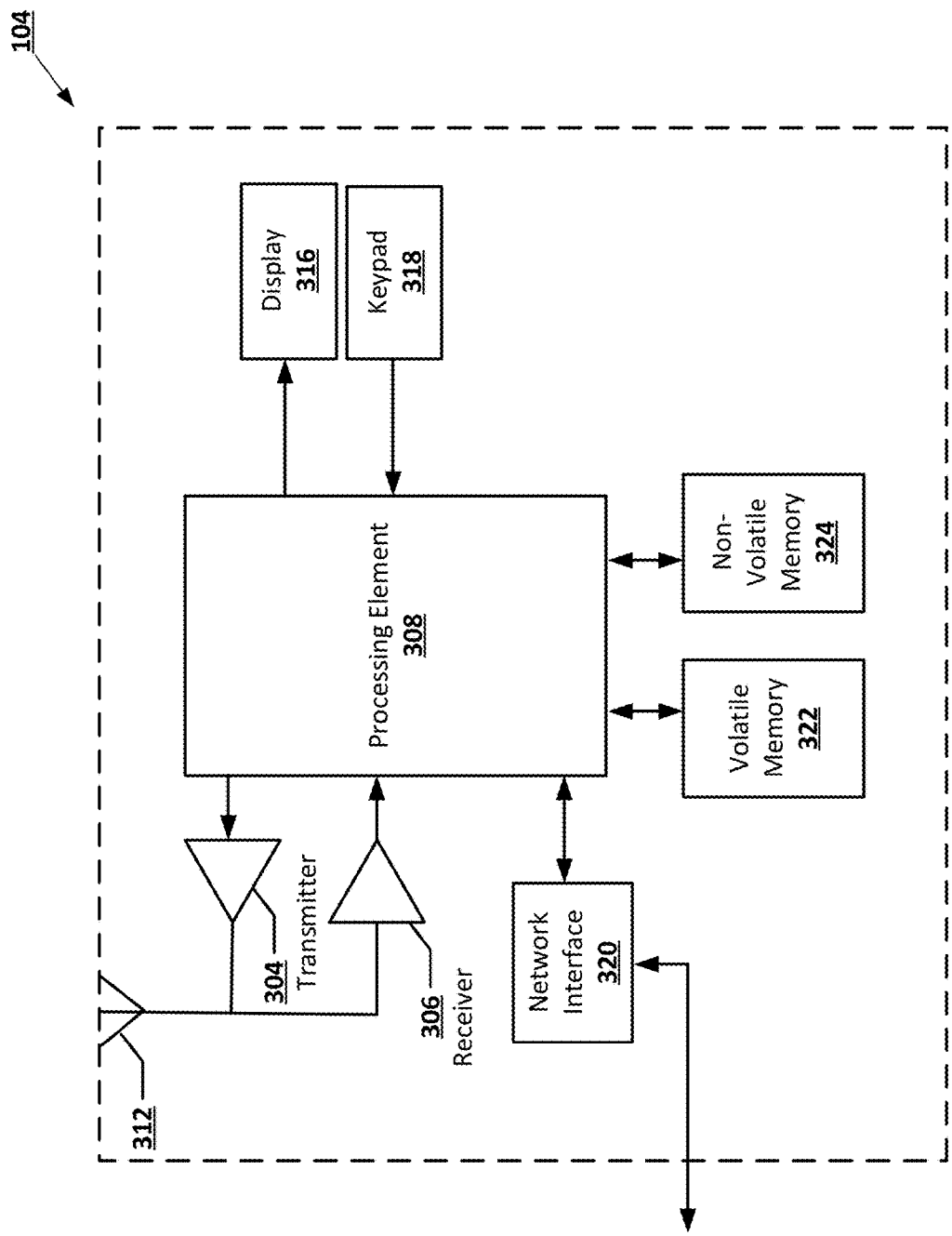
FIG. 3 is an exemplary schematic of a client device node, in accordance with various embodiments of the present disclosure.

FIG. 3 provides a schematic of an example client device 104 that may be used in conjunction with embodiments of the present disclosure. Client devices 104 can be operated by various entities, and an example architecture 100 may include one or more client devices 104. For example, a client device 104 may be associated with, owned by, operated by, and/or the like by one or more end users. In various embodiments, an end user of a client device 104 may wish to convert units of a first digital asset to units of a second digital asset, and may request or initiate a conversion between digital assets using a client device 104. For example, a client device 104 may be a personal computing device, smartphone, tablet, laptop, personal digital assistant, and/or the like. As shown in FIG. 3, the client device 104 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client device 104 may be capable of operating with one or more air interface standards, communication protocols, modulation types, and access types. More particularly, the client device 104 may operate in accordance with any of a number of wireless communication standards and protocols, such as those described above with regard to the account management system 102. In a particular embodiment, the client device 104 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client device 104 may operate in accordance with multiple wired communication standards and protocols, such as those described above with regard to the account management system 102 via a network interface 320.

Via these communication standards and protocols, the client device 104 can communicate with an account management system 102 using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 104 can also download changes, add-ons, and updates, for instance, to its firmware, software (e.g., including executable instructions, applications, program modules), and operating system.

According to one embodiment, the client device 104 may include location determining aspects, devices, modules, functionalities, and/or similar words used herein interchangeably. For example, the client device 104 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the position of the client device 104 in connection with a variety of other systems, including cellular towers, Wi-Fi access points, and/or the like. Similarly, the client device 104 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client device 104 may also comprise a user interface (that can include a display 316 coupled to a processing element 308) and/or a user input interface (coupled to a processing element 308). For example, the user interface may be a user application, app, browser, user interface, and/or similar words used herein interchangeably executing on and/or accessible via the client device 104 to interact with and/or cause display of information/data from the account management system 102, as described herein. The user input interface can comprise any of a number of devices or interfaces allowing the client device 104 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client device 104 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client device 104 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client device 104. As indicated, this may include a user application that is resident on the entity or accessible through a browser or other user interface for communicating with the account management system 102.

In another embodiment, the client device 104 may include one or more components or functionality that are the same or similar to those of the account management system 102, as described in greater detail above. As will be recognized, these architectures and descriptions are provided for exemplary purposes only and are not limiting to the various embodiments.

In various embodiments, the client device 104 may be embodied as an artificial intelligence (AI) computing entity, such as an Amazon Echo, Amazon Echo Dot, Amazon Show, Google Home, and/or the like. Accordingly, the client device 104 may be configured to provide and/or receive information/data from an end user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

c. Exemplary Digital Asset Exchange Systems

In various embodiments, an example architecture (e.g., the architecture 100 illustrated in FIG. 1) comprises one or more digital asset exchange systems 106. A digital asset exchange system 106 may be associated with one or more digital assets and may be involved in the debiting and/or crediting of one or more associated digital assets. Accordingly, the architecture 100 may include one or more digital asset exchange systems 106 to thereby enable an end user to convert between a large variety of different digital assets. In various embodiments, a digital asset exchange system 106 may be a computing entity configured for engaging with an account management system 102 to convert a first/source digital asset to a second/target digital asset for an end user. Specifically, a digital asset exchange system 106 may be configured to manage a digital asset user account for the associated digital asset and associated with the end user and may be further configured to debit, deduct, withdraw, transfer, credit, deposit, and/or the like a number of digital asset units from and/or to the digital asset user account. In various embodiments, the digital asset exchange system 106 may be responsible for transferring fiat currency units to and/or from a fiat currency central operating account associated with the account management system 102 and/or an entity operating the account management system 102 in response to debiting and/or crediting a digital asset user account. Thus, the digital asset exchange system 106 may be involved at least in part in the debiting and the crediting of digital asset units and/or fiat currency units during the execution of a conversion between digital assets, in various embodiments.

Various entities may be associated with and/or operate a digital asset exchange system 106. For example, a digital asset exchange system 106 may be associated with a liability digital asset that may be loyalty or reward points, and the digital asset exchange system 106 may be operated by or associated with a liability holder entity distributing and/or accepting the loyalty or reward points, such as a store entity, a retailer entity, a service provider entity, a banking institution entity, a credit card manager entity, and/or the like. In some instances, a digital asset exchange system 106 associated with a liability digital asset and a liability holder entity may be operated by a third-party entity on behalf of the liability holder entity and/or the liability holder entity itself. Thus, the digital asset exchange system 106 may be and/or comprise one or more computing entities associated with the liability holder entity and may maintain digital asset user accounts (each associated with liability digital assets) for end users corresponding to the liability holder entity. As such, the digital asset exchange system 106 may store and/or have access to records of transactions made by end users with the liability holders that resulted in the assignment or crediting of liability digital asset units to the end users at a previous point in time. Meanwhile, a digital asset exchange system 106 involved in the conversion of cryptocurrency digital assets may be associated with and/or operated by banking institution entities, monetary exchange entities, cryptocurrency exchange entities, stock exchange entities, trading platform entities, and/or the like and may be configured to communicate with and/or may comprise a distributed ledger computing platform. Further, a digital asset exchange system 106 may be associated with and/or operating by an auctioning platform entity, an asset holding entity, and/or the like. For example, such a digital asset exchange system 106 may be involved in the conversion (e.g., sale) of a NFT by an end user.

Therefore, in some instances, the account management system 102 may communicate with one digital asset exchange system 106 for the conversion of a first/source digital asset to a second/target digital asset. For example, the digital asset exchange system 106 may be operated by and/or associated with a first entity associated with the first/source digital asset and a second entity associated with the second/target digital asset. As such, the digital asset exchange system 106 may be configured to debit/credit source digital asset units from/to digital asset user accounts for the source digital asset, while also being configured to debit/credit target digital asset units from/to digital asset user accounts for the target digital asset.

In other instances however, the account management system 102 may communicate with a first digital asset exchange system 106A and a second digital asset exchange system 106B for the conversion of a first/source digital asset to a second/target digital asset. For example, the first digital asset exchange system 106A may be operated by and/or associated with a first entity associated with the first/source digital asset, while the second digital asset exchange system 106B may be operated by and/or associated with a second entity associated with the second/target digital asset. As such, the first digital asset exchange system 106A may be configured to debit/credit source digital asset units from/to digital asset user accounts for the source digital asset, while the second digital asset exchange system 106B may be configured to debit/credit target digital asset units from/to digital asset user accounts for the target digital asset.

In various embodiments, a digital asset exchange system 106 may be configured to generate, determine, and/or have access to historical, indicative, current, and/or real-time exchange rates for a digital asset (e.g., with respect to fiat currency). For example, a digital asset exchange system 106 may be operated by a liability holder entity that may determine a current exchange rate for a liability digital asset based at least in part on supply models, demand models, speculative models, and/or the like. In various embodiments, the digital asset exchange system 106 may be configured to receive exchange rate request API queries originating from an account management system 102 and to transmit exchange rate API responses comprising historical, indicative, current, and/or real-time exchange rates such that the account management system 102 receives the exchange rates for a digital asset.

In various embodiments, a digital asset exchange system 106 may also publish, broadcast, relay, transmit, and/or the like a generalized exchange rate for a digital asset. For example, a digital asset exchange system 106 may establish that a digital asset generally may be exchanged for a particular (full and/or fractional) number of fiat currency units in most if not all instances and for most if not all end users. The digital asset exchange system 106 may be configured to determine or generate a generalized exchange rate based at least in part on various factors including supply models, demand models, speculative models, and/or the like. In various embodiments, the digital asset exchange system 106 may update the generalized exchange rate and publish, broadcast, relay, transmit, and/or the like a new generalized exchange rate. In various embodiments, the account management system 102 may store a configurable generalized exchange rate for the digital asset exchange system 106, and the digital asset exchange system 106 may modify or update the configurable generalized exchange rate by transmitting an API request such that the account management system 102 receives the API request. In various other embodiments, the digital asset exchange system 106 receives an API request or query originating from the account management system 102 asking whether the generalized exchange rate for a digital asset should be used, and the digital asset exchange system 106 may respond with an API response indicating whether the generalized exchange rate should be used and/or including a different exchange rate.

In association with various exchange rates for digital assets, a digital asset exchange system 106 may generate, determine, establish and/or the like configurable rate-specific thresholds or limits and configurable conversion thresholds/limits. A digital asset exchange system 106 may specify through a configurable rate-specific threshold or limit a number of digital asset units that may be exchanged (e.g., debited from, credited to) at a particular exchange rate. For example, an exchange rate may indicate that one-hundred digital asset units is worth one fiat currency unit, and a rate-specific threshold may specify that up to one-hundred-thousand digital asset units may be exchanged (for fiat currency) at the exchange rate of one-hundred digital asset units to one fiat currency unit. Meanwhile, a digital asset exchange system 106 may specify through a configurable conversion threshold/limit a total number of digital asset units that may be exchanged (e.g., debited from, credited to) for an end user, a cohort of end users, within a configurable time period, and/or the like. For example, a conversion threshold may specify that a maximum of one million digital asset units may be debited from digital asset user accounts for a cohort of end users within a time period of a week. Accordingly, with various configurable rate-specific thresholds/limits and configurable conversion thresholds/limits, a digital asset exchange system 106 may maintain economic control (or enable an entity to maintain economic control) over a digital asset.

Thus, a digital asset exchange system 106 may comprise various means for performing at least the herein described functions, operations, methods, processes and/or the like. For example, a digital asset exchange system 106 may comprise various processing elements, volatile and/or non-volatile memory or memory media, network interfaces, user interfaces, and/or the like—including those described with regard to the account management systems 102 and/or client devices 104.

d. Exemplary Networks

In one embodiment, any two or more of the illustrative components of the architecture of FIG. 1 (e.g., one or more account management systems 102, one or more client devices 104, one or more digital asset exchange systems 106) may be configured to communicate with one another via respective communicative couplings to one or more networks 120. The networks 120 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 120 may have any suitable communication range associated therewith and may include, for example, global networks (e.g., the Internet), MANs, WANs, LANs, or PANs. In addition, the networks 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. Exemplary System Operation

Various embodiments of the present disclosure include various functions, steps, operations, methods, processes, and/or the like that may (or may be performed to) address technical challenges related to converting a first/source digital asset to a second/target digital asset for an end user of a client device 104. As previously discussed, the account management system 102 may periodically retrieve exchange rates for at least both a source digital asset and a target digital asset based at least in part on a configurable refresh time period and/or a configurable execution time period. The account management system 102 may also generate and provide conversion behavior analytic data objects to a digital asset exchange system 106 when retrieving an exchange rate for a digital asset, thereby advantageously providing the digital asset exchange system 106 with a significant amount of information relevant to the determination of an exchange rate for a digital asset. The account management system 102 may further generate an aggregated conversion rate between the source and target digital assets satisfying various rate-specific thresholds or limits and provide the aggregated conversion rate to the client device 104, thereby reducing excess amounts of information being presented to an end user.

Further, the account management system 102 may, in various embodiments, generate, assign, and/or manage a unique and federated identifier token for an end user and use the same identifier token when communicating with different digital asset exchange systems 106. Even further, the account management system 102 may advantageously enable various entities associated with and/or operating digital asset exchange systems 106 to establish and configure various conversion thresholds and/or limits to maintain control over a digital asset supply, value, demand, and/or the like. Further still, the account management system 102 may be configured to execute digital asset conversions and subsequently execute efficient and improved settlements for both the debiting of a source digital asset and the crediting of a target digital asset through fiat currency transactions with one or more digital asset exchange systems 106. At least these described technical solutions of various embodiments are provided through the various functions, steps, operations, methods, processes, and/or the like described herein.

Various steps/operations and processes are described herein in reference to an exemplary illustrative scenario that should not be construed to limit the scope of the present disclosure. That is, reference will be made to the exemplary illustrative scenario throughout the present disclosure to further describe and provide additional descriptive context to the various steps/operations and processes performed in various embodiments. In this exemplary illustrative scenario, an end user of a client device 104 is in ownership of a first digital asset user account for a source digital asset with a balance of twenty-thousand units and is also in ownership of a second digital asset user account for a target digital asset. Specifically, the first digital asset user account has a balance of twenty-thousand reward points distributed and managed by a liability holder entity that also manages the digital asset user account (e.g., via a digital asset exchange system 106), and the target digital asset may be an in-game asset. The end user desires to redeem ten-thousand reward points for in-game assets. In the exemplary illustrative scenario, the second digital asset user account is managed by a different entity via another digital asset exchange system 106.

a. Exemplary Processes

Figure 4A:
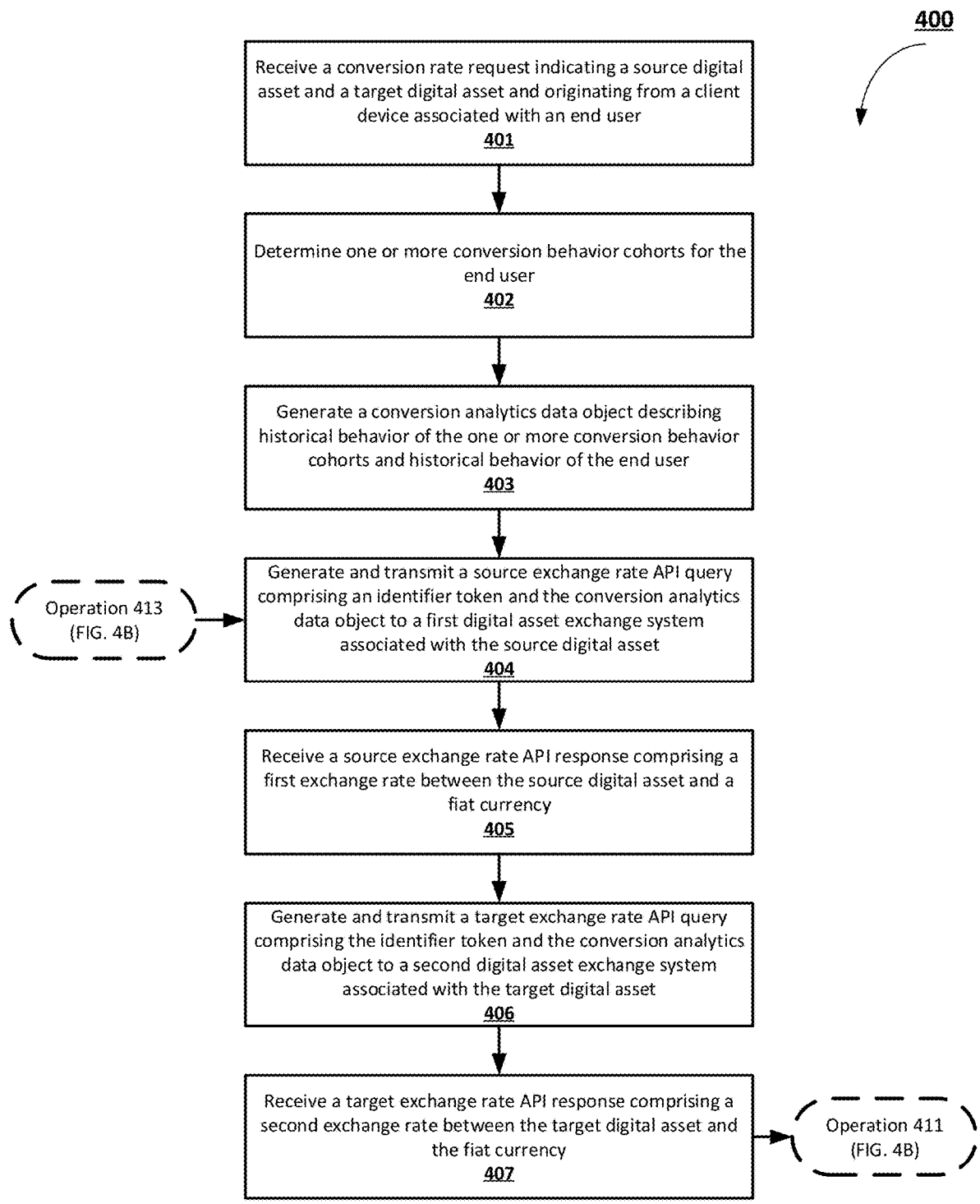

FIG. 4A provides a process 400 for converting a source digital asset to a target digital asset, such as by initiating a conversion of a source digital asset to a target digital asset. In various embodiments, the account management system 102 comprises means, such as processing element 205, memories 210, 215, network interface 220, and/or the like, for performing each of the steps/operations of process 400 to initiate a conversion of a source digital asset to a target digital asset.

Process 400 comprises step/operation 401. In one embodiment, process 400 may begin with, may be initiated by, and/or the like step/operation 401. Step/operation 401 comprises receiving a conversion rate request indicating a source digital asset and a target digital asset, the conversion rate request originating from a client device 104 associated with an end user. For example, the account management system 102 receives a conversion rate request originating from a client device 104 via a network interface 220. In various embodiments, the conversion rate request may be an API call, query, request, and/or the like transmitted by the client device 104. In the exemplary illustrative scenario, the end user indicates, via the client device 104, the end user's desire to redeem ten-thousand reward points for in-game assets, and as such, the conversion rate request may indicate at least the reward points as the source digital asset, the in-game asset as the target digital asset, the liability holder entity managing the source digital asset, and/or the entity managing the target digital asset.

Process 400 may comprise step/operation 402. Step/operation 402 comprises determining one or more conversion behavior cohorts for the end user. In various embodiments, a conversion behavior cohort may be determined based at least in part on demographic information and/or other information associated with the end user. For example, the account management system 102 may determine or identify an age group conversion behavior cohort based at least in part on the age of the end user, a gender conversion behavior cohort based at least in part on the gender of the end user, a location conversion behavior cohort based at least in part on the residence of the end user, and/or the like. In any such instances, a conversion behavior cohort may be composed of different end users with similar demographic information with the end user. Accordingly, the account management system 102 may store, retrieve, and/or have access to demographic information and/or other information associated with the end user. In some embodiments, an account balance data associated with the end user, a first digital asset user account, a second digital asset user account, and/or a fiat currency user account may store or record demographic information and/or other information associated with the end user.

Additionally or alternatively, a conversion behavior cohort for the end user may be determined and identified based at least in part on the account information, status, activity history, and/or the like of one or more digital asset user accounts and/or a fiat currency user account associated with the end user. In some instances, various digital asset user accounts associated with various different end users may be associated or assigned with different statuses, levels, tiers, and/or the like by a digital asset exchange system managing the various digital asset user accounts, such statuses being based at least in part on various factors such as history, a number of purchases made (e.g., loyalty), membership fees, and/or the like. Accordingly, a conversion behavior cohort may be composed of other end users with digital asset user accounts with the same status, level, tier, and/or the like as the end user.

Similarly, a conversion behavior cohort may be determined and identified based at least in part on activity history, or usage behavior of a digital asset and/or fiat currency. For example, a conversion behavior cohort may be composed of end users who have not used or redeemed a digital asset, while another conversion behavior cohort may be composed of end users who frequently use or redeem the digital asset (e.g., for services, for physical goods, for fiat currency, for other digital assets). It may be appreciated then that a conversion behavior cohort may be specific to the source digital asset or the target digital asset. For example, an end user who infrequently uses (e.g., redeems) a source digital asset and frequently uses a target digital asset may belong to a first conversion behavior cohort composed of end users who infrequently use the source digital asset and may also belong to a second conversion behavior cohort composed of end users who frequently use the target digital asset. Overall, it will be understood that conversion behavior cohorts for an end user may be determined based at least in part on various different criteria, and that one or more conversion behavior cohorts may be determined for the end user.

Generally, such account information or status (e.g., status, level, tier of a user account) and account activity (e.g., usage of a digital asset) may be determined based at least in part on account balance data objects corresponding to user accounts associated with the end user. For example, an account balance data object may describe a status, level, tier, and/or the like of a corresponding user account and may also describe the activity history of the corresponding user account. As such, the account management system 102 may store, retrieve, and/or have access to various account balance data objects for determining one or more conversion behavior cohorts for the end user.

Process 400 may then comprise step/operation 403, which comprises generating a conversion behavior analytics data object describing (i) historical behavior of the determined one or more conversion behavior cohorts, and (ii) historical behavior of the end user. In various embodiments, the described historical behavior may be specific to a digital asset, such as the source digital asset or the target digital asset. For example, the conversion behavior analytics data object may describe a number of times an end user and/or a cohort of end users redeemed the source digital asset (e.g., for services, for physical goods, for fiat currency, for other digital assets), a number of times an end user and/or a cohort of end users redeemed the target digital asset, various exchange rates at which the source digital asset was used, various exchange rates at which the target digital asset was used, historical exchange rate trends for the source digital asset, historical exchange rate trends for the target digital asset, and/or the like. In various embodiments, the conversion behavior analytics data object may at least indicate and/or suggest exchange rates at which the end user and/or a conversion behavior cohort of the end user have historically used a digital asset.

In various embodiments, the conversion behavior analytics data object may comprise predictive indications related to the usage of a digital asset, such as a probability of whether the end user would convert the digital asset for a fiat currency at a particular exchange rate, for example. As such, the conversion behavior analytics data object may be generated based at least in part on various predictive models, optimization models, classification models, neural network models, supervised or unsupervised machine learning models, and/or the like configured to output predictions and/or probabilities as to whether a particular exchange rate would be acceptable to and/or lead to usage of the digital asset by the end user and/or a conversion behavior cohort of the end user.

Process 400 comprises step/operation 404, which includes generating and transmitting a source exchange rate API query such that a first digital asset exchange system 106A receives the source exchange rate API query. The first digital asset exchange system 106A may be associated with and/or operated by an entity associated with the source digital asset, and the first digital asset exchange system 106A may be configured to manage (e.g., debit/credit units of) the source digital asset. In various embodiments, the source exchange rate API query comprises a unique and federated identifier token associated with the end user and the conversion behavior analytics data object. In some embodiments, the source exchange rate API query comprises a conversion behavior analytics data object specific to the source digital asset and comprises information relating to the source digital asset. In various embodiments, the conversion behavior analytics data object may be partitioned, sectioned, structured, encrypted, hashed, and/or the like such that the first digital asset exchange system 106A may only access information relating to the source digital asset. In other embodiments, a source-specific conversion behavior analytics data object and a target-specific conversion behavior analytics data object are generated, and the source exchange rate API query includes only the source-specific conversion behavior analytics data object.

In general, the source exchange rate API query may be configured to cause the first digital asset exchange system 106A to generate, determine, and/or provide an exchange rate for the source digital asset with respect to fiat currency and may specifically indicate or describe the source digital asset. In various embodiments, the source exchange rate API query may also comprise a request for historical exchange rates. For example, a source exchange rate API query indicating a cryptocurrency digital asset as the source digital asset may be configured to cause the first digital asset exchange system 106A to at least provide historical exchange rates for the cryptocurrency digital asset with respect to fiat currency over a configurable past time period.

In various embodiments, the source exchange rate API query comprises an identifier token associated with the end user and configured to uniquely identify the end user for the first digital asset exchange system 106A and/or to identify a first digital asset user account associated with the end user, the first digital asset user account being specific to the source digital asset. For example, the identifier token may comprise names of the end user, a birthdate, Social Security number, contact information (e.g., an e-mail address, a phone number) and/or other personal identifying information. Furthermore, the identifier token may comprise various account identifiers for the first digital asset user account. In some instances, the identifier token may comprise a distributed ledger public key value and/or a cryptocurrency address in order to identify the first digital asset user account for a cryptocurrency exchanged via a distributed ledger. In various embodiments, the identifier token may be and/or may comprise a GUID, a UIUD, a hash or cryptographic value of user information or credentials, and/or the like.

In some instances, the first digital asset user account is managed and/or custodied by the entity (e.g., a liability holder entity that manages and/or custodies a digital asset user account for liability digital assets) associated with the first digital asset exchange system 106A, and the first digital asset user account may be associated with identifiers internal to the first digital asset exchange system 106A which may be unrecognized and inaccessible by the account management system 102. Accordingly, the identifier token associated with the end user may be configured to cause the first digital asset exchange system 106A to identify a first digital asset user account specific to the source digital asset that may be custodied or accessible by the first digital asset exchange system 106A. For example, the identifier token may be established based at least in part on single sign-on (SSO) authentication techniques and/or methods. As such, various embodiments of the present disclosure provide technical advantages by enabling an end user to request conversions of source digital asset units of a first digital asset user account via an account management system 102 that may not necessarily manage or be in custody of the first digital asset user account.

In various embodiments, the end user may be associated with multiple digital asset user accounts specific to the source digital asset, and the identifier token may be configured to cause the first digital asset exchange system 106A at least to identify each and every digital asset user account associated with the end user and specific to the source digital asset, and/or identify a higher-level user account referencing or comprising the multiple digital asset user accounts. As an example, an end user may own a user account with a banking institution that distributes reward points, and the end user may earn reward points through one or more credit card accounts. In this example then, each credit card account may be a digital asset user account specific to the reward point digital asset and associated with a corresponding digital asset unit balance, and the user account with the banking institution may reference and/or comprise each credit card account. By extension, one or more account balance data objects each corresponding to a credit card account may be nested within and/or otherwise associated with a higher-level account balance data object associated with the end user, the higher-level account balance data object configured to describe the total balance of digital assets across all the credit card accounts.

Furthermore, the identifier token associated with the end user may be federated for various different digital asset exchange systems 106. In various embodiments, the same identifier token associated with the end user may be used to identify the first digital asset user account for the source digital asset and managed by a first digital asset exchange system 106A, as well as to identify a second digital asset user account for the target digital asset and managed by a second digital asset exchange system 106B. Thus, the identifier token may be established based at least in part on SSO authentication techniques and/or methods for different digital asset exchange systems 106. It will be appreciated then that additional technical advantages are provided here by reducing, compressing, minimizing, and/or the like the amount of data needed to identify an end user for various different digital asset exchange systems 106. In various embodiments, the account management system 102 is configured to provide the identifier token associated with the end user to a particular digital asset exchange system 106 to identify a particular digital asset user account without compromising the authentication, credentials, identifiers, and/or the like for other digital asset user accounts managed by other digital asset exchange systems 106. For example, a first digital asset exchange system 106A receiving the identifier token (e.g., with the source exchange rate API query) may be barred, precluded, prevented, and/or the like from accessing information related to a second digital asset user account for the target digital asset and managed by a second digital asset exchange system 106B.

In various embodiments, step/operation 405 may follow step/operation 404. Step/operation 405 comprises receiving a source exchange rate API response comprising an exchange rate between the source digital asset and a fiat currency, or a source exchange rate. The source exchange rate API response may originate from the first digital asset exchange system 106A. The source exchange rate API response may be a response to the source exchange rate API query transmitted by the account management system 102 in step/operation 404. In some embodiments, the source exchange rate API response comprises historical, indicative, current, and/or real-time exchange rates for the source digital asset. In various embodiments, the source exchange rate API response may further indicate an execution time period for which the exchange rate for the source digital asset is valid. For example, the first digital asset exchange system 106A may determine an exchange rate for an execution time period and indicate that the first digital asset exchange system 106A will engage in a conversion involving the source digital asset based at least in part on the exchange rate only within the execution time period.

In various embodiments, the source exchange rate API response may indicate various rate-specific thresholds or limits. The digital asset exchange system 106 may generate or determine various such rate-specific thresholds or limits that may affect exchange of the source digital asset. In some instances, a rate-specific threshold or limit may indicate that only a particular number of source digital asset units may be converted to fiat currency. For example, a rate-specific threshold or limit may indicate that up to 100,000 digital asset units (or any other range or band of units) may be converted to fiat currency at the provided exchange rate. Similarly, the source exchange rate API response may include one or more exchange rates each with corresponding rate-specific thresholds or limits. As an example, the source exchange rate API response may indicate that one unit of a liability digital asset may be converted to USD $5, two units may be converted to USD $7, and five units may be converted to USD $15. Thus, in some embodiments, exchange rates may be subject to discrete rate-specific thresholds or limits.

In various embodiments, the source exchange rate API response comprises one or more exchange rates between the source digital asset and one or more fiat currencies. For example, a first exchange rate may indicate the value of the source digital asset with respect to US dollars, while a second exchange rate may indicate the value of the source digital asset with respect to EU euros. In various other embodiments, the source exchange rate API query may indicate a specific fiat currency, and the source exchange rate API response may accordingly comprise an exchange rate with respect to the indicated fiat currency. For example, the end user may have selected a specific fiat currency to receive in the digital asset conversion. As another example, the source exchange rate API query may have indicated a specific fiat currency based at least in part on stored data in an account balance data object indicating a preferred fiat currency. As yet another example, the source exchange rate API query may have indicated a specific fiat currency based at least in part on the real-time determination or approximation of the end user's location (e.g., via the client device 104).

In some instances, the source exchange rate API query may indicate a generalized exchange rate for the source digital asset for all transaction/exchange unit amounts, for all end users or cohorts, and/or the like. For example, the source digital asset is a cryptocurrency with an exchange rate universally applied to all end users. Thus, in some instances, the source exchange rate API response may indicate that a previously published, stored, broadcasted, and/or the like source exchange rate should be used for the conversion. In some embodiments, the source exchange rate API response comprises instructions to modify a previously determined generalized exchange rate.

In other instances, one or more exchange rates for the source digital asset may be dynamic and/or predictive. For example, an exchange rate for the source digital asset may be determined (e.g., by the first digital asset exchange system 106A) based at least in part on the end user's historical and current conversion behavior (e.g., usage of the source digital asset) and/or a cohort's historical and current conversion behavior provided via the conversion behavior analytics data object. In some examples, the first digital asset exchange system 106A uses various predictive models, optimization models, machine learning models, and/or the like to determine an exchange rate for the source digital asset using the conversion behavior analytics data objects.

For example, the first digital asset exchange system 106A may determine a first exchange rate for the source digital asset when the end user has used the source digital asset (e.g., exchange for fiat currency, convert to other digital assets) more than a configurable threshold number of times within a configurable time period (e.g., the past week, the past month, the past year), and may determine a second exchange rate for the source digital asset when the end user has used the source digital asset less than the threshold number of times within the configurable time period. Thus, the first digital asset exchange system 106A may train and use various models to determine (e.g., based at least in part on extrapolation, regression, prediction, and/or the like) an exchange rate for the source digital asset based at least in part on dynamic user activity or behavior (of the end user and/or the conversion behavior cohort of the end user).

As also discussed, the exchange rate for the source digital asset determined by the first digital asset exchange system 106A may additionally or alternatively be predictive. Specifically, the first digital asset exchange system 106A may determine an exchange rate for the source digital asset with the highest predicted likelihood that the end user will approve the exchange rate for an exchange of the source digital asset for fiat currency. While the conversion of a source digital asset to a target digital asset does not involve fiat currency from the end user's perspective, the aggregated conversion rate from the source digital asset to the target digital asset is based at least in part on the exchange rate for the source digital asset and is presented to and evaluated by the end user. In some instances, the first digital asset exchange system 106A also may not be aware of the conversion of the source digital asset to a target digital asset and may only be configured to determine an exchange rate for the source digital asset for an exchange of the source digital asset for fiat currency.

Accordingly, the first digital asset exchange system 106A may train various models (e.g., in a supervised manner, semi-supervised manner, and/or unsupervised manner) using data describing whether or not the end user and/or a cohort has historically exchanged the source digital asset for fiat currency (e.g., by the end user, by the account management system 102 in a conversion to a target digital asset) for a particular exchange rate, such data being included in the conversion behavior analytics data object. The first digital asset exchange system 106A may then use the various trained models to determine an exchange rate for the source digital asset likely to be accepted by the end user. For example, the first digital asset exchange system 106A may determine that the end user is more likely to accept a first exchange rate where one source digital asset unit is worth USD $20 than a second exchange rate where one source digital asset unit is worth USD $5. In various embodiments, the first digital asset exchange system 106A may train and use various predictive models, optimization models, machine learning models, and/or the like to predict a maximal exchange rate (e.g., lowest number of fiat currency units for one source digital asset unit, highest number of source digital asset units for one fiat currency unit) that the end user is likely to accept. Thus, in various embodiments, various predictive models, optimization models, machine learning models, and/or the like may be trained to generate (e.g., output) a dynamic exchange rate likely to be accepted by the end user upon being provided with at least a conversion behavior analytics data object.

It may be appreciated that in reality, the end user may not be presented with the exchange rate directly and may not accept the exchange rate explicitly. However, generating an exchange rate in a predictive manner remains relevant, as the end user is presented with an aggregated conversion rate based at least in part on the exchange rate of the source digital asset and may reject the aggregated conversion rate if undesired. As also previously mentioned, the prediction of likelihood that the end user will accept the exchange rate of the source digital asset may also be agnostic to whether the source digital asset is being exchanged for fiat currency or converted to another digital asset, as the conversion of the source digital asset to another digital asset involves first exchanging the source digital asset for fiat currency anyway.

In various embodiments, the source exchange rate API response may be received originating from the first digital asset exchange system 106A and/or may be received from another entity associated with the entity associated with the first digital asset exchange system 106A. In an example scenario, a liability holder entity distributing and/or accepting a liability digital asset may be associated with a third-party entity that manages the economy of the liability digital asset, in part by determining exchange rates for various end users and/or cohorts of end users. As such, the source exchange rate API response may be received originating from such a third-party entity (e.g., instead of the entity associated with the first digital asset exchange system 106A).

In various embodiments, the source exchange rate API response comprises an account balance data object corresponding to the first digital asset user account for the source digital asset. In various embodiments, the source exchange rate API response is configured to cause the account management system 102 to generate and/or update an account balance data object corresponding to the first digital asset user account in memory 210, 215 of the account management system 102. As such, the account management system 102 may be aware of the current source digital asset unit balance of the first digital asset user account upon receiving the source exchange rate API response, in some embodiments.

As previously discussed, the conversion of a source digital asset to a target digital asset involves the exchange of fiat currency units for target digital asset units. To execute such an exchange and to determine an aggregated conversion rate from a source digital asset to the target digital asset, an individual exchange rate for the target digital asset with respect to fiat currency may be obtained. As such, process 400 may comprise step/operation 406, which includes generating and transmitting a target exchange rate API query. In various embodiments, a second digital asset exchange system 106B receives the target exchange rate API query, the second digital asset exchange system 106B being associated with and/or operated by an entity managing the target digital asset. The second digital asset exchange system 106B may be configured to manage the target digital asset. In some instances, the second digital asset exchange system 106B may be the first digital asset exchange system 106A. That is, the same digital asset exchange system 106 may receive both the source exchange rate API query and the target exchange rate API query, and may be configured to manage both the source digital asset and the target digital asset.

Thus, in general, the target exchange rate API query is transmitted such that a digital asset exchange system 106 associated with the target digital asset receives the target exchange rate API query.

In various embodiments, the target exchange rate API query may be similar to the source exchange rate API query. The target exchange rate API query may comprise the identifier token associated with the end user and a conversion behavior analytics data object. In various embodiments, the target exchange rate API query is configured to cause the second digital asset exchange system 106B to generate, determine, and/or provide an individual exchange rate for the target digital asset with respect to fiat currency and may specifically indicate or describe the target digital asset. The identifier token may be configured to cause the second digital asset exchange system 106B to identify the end user and/or identify one or more second digital asset user accounts for the target digital asset. The identifier token for the target exchange rate API query may be the same identifier token for the source exchange rate API query.

In some embodiments, the conversion behavior analytics data object for the target exchange rate API query is the same conversion behavior analytics data object for the source exchange rate API query. That is, the conversion behavior analytics data object comprises information relating to both the source digital asset and the target digital asset. In some other embodiments, the conversion behavior analytics data object for the target exchange rate API query comprises only information relating to the target digital asset.

In various embodiments, the target exchange rate API query and the source exchange rate API query may be generated and transmitted substantially simultaneously or in parallel such that the exchange rate for the source digital asset and the exchange rate for the target digital asset may be obtained at substantially the same time. In various other embodiments, the target exchange rate API query may be generated and transmitted subsequently to the source exchange rate API query, and further, may be based at least in part on the received source exchange rate API response. Specifically, the target exchange rate API query may be based at least in part on the source exchange rate and/or various rate-specific thresholds or limits for source exchange rate. For example, the received source exchange rate API response may indicate that only a maximum of one-hundred-thousand reward points digital assets may be exchanged for a maximum for USD $100, and thus, the target exchange rate API query may request target exchange rates describing the number of target digital asset units that specifically may be obtained for USD $100. As another example, the received source exchange rate API response may indicate one or more discrete fiat currency unit numbers (e.g., USD $5, USD $10, and USD $20) that may be obtained for exchanging the source digital asset, and then the target exchange rate API query may request target exchange rates describing the number of target digital asset units that may be obtained for each discrete fiat currency unit number (e.g., twenty-five target digital asset units for USD $5, forty-five target digital asset units for USD $10, seventy-five target digital asset units for USD $20). Thus, in some embodiments, the target exchange rate API query may be dependent on the source exchange rate API response.

In various embodiments, step/operation 407 may follow step/operation 406. Step/operation 407 comprises receiving a target exchange rate API response comprising an exchange rate for the target digital asset. The target exchange rate API response may originate from the second digital asset exchange system 106B and may be a response to the target exchange rate API query. Similar to the source exchange rate API response, the target exchange rate API response may comprise various rate-specific thresholds or limits and may comprise one or more target exchange rates. A target exchange rate may also be associated with an execution time period for which the target exchange rate is valid. In some embodiments, the target exchange rate API response includes a generalized exchange rate to be used in most instances or scenarios and/or indicate a previously determined and/or generalized exchange rate. In other instances, the target exchange rate API response comprises instructions to modify a previously determined generalized exchange rate.

Similar to the source exchange rate, or the exchange rate for the source digital asset, the target exchange rate may be dynamic and/or predictive. For example, the second digital asset exchange system 106B may generate a target exchange rate using various predictive models, optimization models, machine learning models, and/or the like to dynamically determine a target exchange rate based at least in part on an end user's and/or a cohort's historical and/or recent usage of the target digital asset (e.g., exchange for fiat currency, converting to other digital assets) that may have a predicted likelihood of being accepted by the end user if presented to the end user. Again, the target exchange rate may not be explicitly presented to the end user in some embodiments; however, an aggregated conversion rate between the source digital asset and the target digital asset may be based at least in part on the target exchange rate and may be presented to the end user for approval. Thus, in various embodiments, a dynamic and predictive target exchange rate is generated by the second digital asset exchange system 106B.

Figure 4B:
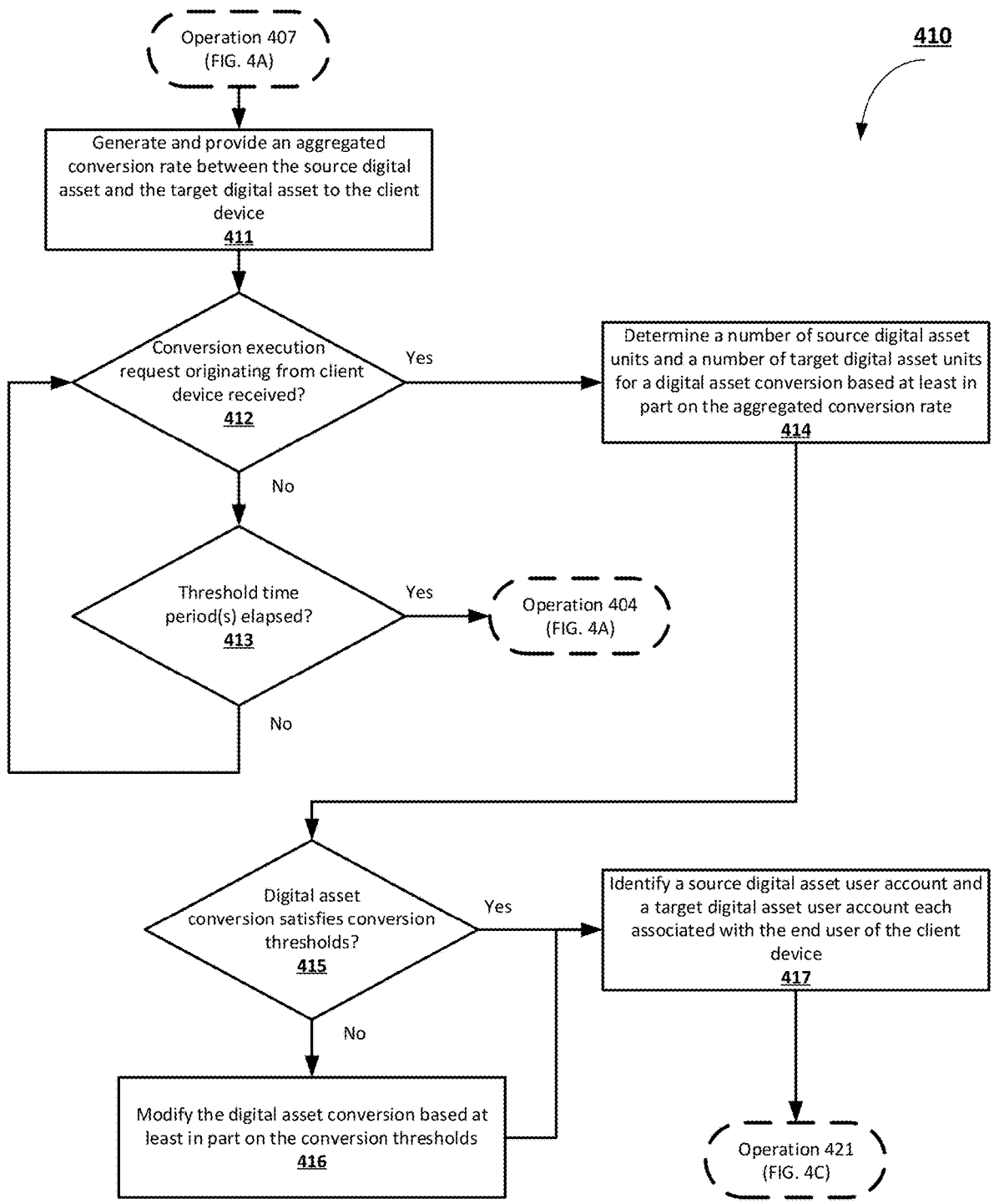

Using both the exchange rate for the source digital asset and the exchange rate for the target digital asset (each with respect to fiat currency), the account management system 102 may then determine an aggregated conversion rate between the source digital asset and the target digital asset. Referring now to FIG. 4B, a process 410 is provided for further initializing the conversion between the source digital asset and the target digital asset. In various embodiments, the account management system 102 comprises means, such as processing element 205, memories 210, 215, network interface 220, and/or the like, for performing each of the steps/operations of process 410 to further initialize the conversion between the source digital asset and the target digital asset. Process 410 comprises step/operation 411, which includes generating and providing an aggregated conversion rate between the source digital asset and the target digital asset to the client device 104.

In various embodiments, the aggregated conversion rate may be generated based at least in part on the individual exchange rates for the source digital asset and the target digital asset in addition to rate-specific thresholds or limits associated with each individual exchange rate. Specifically, the aggregated conversion rate is determined such that the aggregated conversion rate satisfies each and every rate-specific threshold or limit. As such, the aggregated conversion rate may be determined using an optimization model configured to evaluate a plurality of constraints (e.g., the rate-specific thresholds or limits) and to generate an output satisfying the plurality of constraints.

For example, in the exemplary illustrative scenario, the liability holder entity managing the source digital asset may indicate that up to fifteen-thousand reward points may be exchanged for USD $150, while the entity managing the target digital asset may indicate that only up to five-hundred in-game assets may be exchanged (e.g., purchased) for USD $100. Due to the rate-specific threshold with respect to the target digital asset, the account management system 102 may use an optimization model to generate an aggregated conversion rate of ten-thousand reward points for five-hundred in-game assets. In many instances, there may be more than one rate-specific threshold, and the optimization model generates an aggregated conversion rate satisfying each and every rate-specific threshold. In some instances, the exchange rates and associated rate-specific thresholds may be structured as discrete values. For example, it may be indicated that fifty in-game assets may be purchased for USD $10, one-hundred in-game assets may be purchased for USD $25, two-hundred in-game assets may be purchased for USD $25; however, such conversion rates may not be interpolated or extrapolated to purchase fifty-seven in-game assets, for example. Thus, the aggregated conversion rate may be determined based at least in part on such discrete values.

Subsequent to determining an aggregated conversion rate, the account management system 102 may provide the aggregated conversion rate to the end user via the client device 104. In various embodiments, the aggregated conversion rate is provided in an API response to a conversion rate request originating from the client device 104 (e.g., in step/operation 401). In various embodiments, the aggregated conversion rate may be provided with instructions causing the client device 104 to provide the aggregated conversion rate to the end user. For example, the client device 104 may be caused to provide the aggregated conversion rate in a notification to the end user. As another example, the client device 104 may display the aggregated conversion rate to the end user via a user interface. In the exemplary illustrative scenario, the end user is notified of the aggregated conversion rate by an indication of how many in-game assets will be received for the redemption of ten-thousand reward points, which may specifically be five-hundred in-game assets based at least in part on the exchange rate of ten-thousand reward points for USD $100 and the exchange rate of USD $100 for five-hundred in-game assets. Additionally or alternatively, the end user may be notified of a simplified conversion rate, such as twenty reward points for one in-game asset. In various scenarios or instances, the aggregated conversion rate may be fractional with respect to the source digital asset (e.g., one target digital asset unit is worth 0.3 source digital asset units) or with respect to the target digital asset (e.g., one source digital asset unit is worth 0.7 target digital asset units). Further, the aggregated conversion rate may be provided to the end user via the client device 104 from a source digital asset perspective (e.g., a number of target digital asset units equal in value to one source digital asset unit) and/or from a target digital asset perspective (e.g., a number of source digital asset units equal in value to target digital asset unit). In some instances, one or more aggregated conversion rates based at least in part on discrete rate-specific thresholds or limits may be presented to the end user. For example, it may be indicated to the end user via the client device 104 that one-hundred reward points may be converted to five in-game assets, two-hundred reward points may be converted to eight in-game assets, and two-hundred-and-fifty reward points may be converted to twelve in-game assets.

At step/operation 412, the account management system 102 determines whether a conversion execution request originating from the client device 104 has been received. In various embodiments, the conversion execution request may be transmitted by the client device 104 based at least in part on user input. The conversion execution request may indicate the end user's approval of the aggregated conversion rate between the source digital asset and the target digital asset provided to the client device 104. In various embodiments, the conversion execution request may comprise at least one of (i) a number of target digital asset units desired, or (ii) a number of source digital asset units to spend or debit. In the exemplary illustrative scenario, the conversion execution request is an indication that the end user has reviewed and has confirmed the conversion of ten-thousand reward points for five-hundred in-game assets.

If the account management system 102 determines that a conversion execution request originating from the client device 104 has not been received, step/operation 413 may be performed. That is, the account management system 102 may determine whether one or more configurable threshold time periods have elapsed. In various embodiments, the one or more configurable threshold time periods may represent a time period within which the aggregated conversion rate between the source digital asset and the target digital asset, the source exchange rate, and/or the target exchange rate is accurate and/or valid for the execution of a conversion. For example, the one or more configurable threshold time periods may comprise a configurable refresh time period representing a temporal resolution at which the exchange rate for the target digital asset may vary. Additionally or alternatively, the one or more configurable threshold time periods may comprise a configurable refresh time period for the source exchange rate. Thus, the account management system 102 may determine whether one or more configurable refresh time periods have elapsed to thereby determine whether the aggregated conversion rate provided to the client device 104 may have changed, potentially due to the source digital asset and/or the target digital asset changing in value since providing the aggregated conversion rate to the client device 104. In various embodiments, the refresh time period may be configured to be 30, 60, 90, 180, and/or the like second time periods.

Likewise, the one or more configurable threshold time periods may comprise a configurable execution time period representing a time period within which an exchange rate for a digital asset (e.g., a source digital asset, a target digital asset) may be valid for the execution of a conversion between the source digital asset and the target digital asset. For example, a digital asset exchange system 106 may indicate (e.g., in a source exchange rate API response, in a target exchange rate API response) a time period for which an exchange rate is valid. It may be appreciated that for a digital asset with volatile value (e.g., a cryptocurrency), a configurable execution time period may be longer in duration than a configurable refresh time period, such that conversions, exchanges, and other transactions with such volatile digital assets are executed based at least in part on a previously agreed-upon conversion rate, exchange rate, or value. In various embodiments, the execution time period may be configured to 1, 2, 5, 10, 20, and/or the like minute time periods.

Accordingly, if the account management system 102 determines that one or more configurable time periods (e.g., a refresh time period, an execution time period) have elapsed, the account management system 102 may obtain a new exchange rate for the source digital asset and/or the target digital asset and determine a new aggregated conversion rate. For example, the account management system 102 may perform at least steps/operations 404, 405, 406, 407 and 411 again to determine and provide an updated aggregated conversion rate. Subsequent to providing an updated conversion rate, the account management system 102 may again determine whether a conversion execution request originating from the client device 104 has been received and whether one or more configurable time periods have elapsed again. Otherwise, as illustrated in FIG. 4B, the account management system 102 may continue to determine whether a conversion execution request originating from the client device 104 has been received, at step/operation 412.

However, if the conversion execution request is received at step/operation 412, the account management system 102 may proceed to execute the conversion of the source digital asset to the target digital asset as indicated, described, and requested in the conversion execution request. The account management system 102 may perform step/operation 414, which comprises determining a number of source digital asset units and a number of target digital asset units for the conversion based at least in part on the aggregated conversion rate. At least one of (i) the number of source digital asset units to spend or debit, or (ii) the number of target digital assets to receive may be indicated by the conversion execution request. For example, the at least one of (i) the number of source digital asset units to spend or debit, or (ii) the number of target digital asset units to receive may have been specified by the end user of the client device 104 via user interaction with a user interface. In various embodiments, a respective other one of (i) the number of source digital asset units to spend, or (ii) the number of target digital asset units to receive may be determined based at least in part on the aggregated conversion rate between the source digital asset and the target digital asset. In other embodiments, the conversion execution request comprises both (i) the number of source digital asset units to spend and (ii) the number of target digital asset units to receive. In such embodiments, the account management system 102 may verify that each number in relation to the respective other is accurate and satisfies the conversion rate of the digital asset.

Having determined both (i) the number of source digital asset units to spend and (ii) the number of target digital asset units to receive, the account management system 102 may determine whether the digital asset conversion satisfies various conversion thresholds and/or limits, which may be established and configured by the first digital asset exchange system 106A and/or the second digital asset exchange system 106B. In various embodiments, a digital asset exchange system 106 may establish and configure various conversion threshold and/or limits that may manage and/or maintain the value or economy of a corresponding digital asset (e.g., the source digital asset, the target digital asset). For example, the first digital asset exchange system 106A may establish and configure a conversion threshold preventing an end user from redeeming over a threshold number of source digital asset units. In various embodiments, a digital asset exchange system 106 may establish and configure a cohort-based conversion threshold preventing a cohort of end users from converting a total number of digital asset units. For example, the second digital asset exchange system 106B may establish and configure a conversion threshold preventing a cohort of end users from obtaining over a threshold number of target digital asset units. In other instances, a conversion threshold is a threshold number of digital asset conversions (or individual exchanges of a digital asset with fiat currency) that may be executed within a configurable time period.

Thus, in various embodiments, the account management system 102 may evaluate whether the digital asset conversion satisfies various conversion thresholds and/or limits. For example, the account management system 102 may determine a total number of source digital asset units debited over the current time period including the source digital asset units to debit for the present digital asset conversion and evaluate whether the total number of source digital asset units debited/to be debited satisfies a threshold. Similarly, the account management system 102 may determine a total number of target digital asset units credited over a current time period including the target digital asset units to credit for the present digital asset conversion and perform a similar evaluation. The account management system 102 may additionally or alternatively determine whether a total number of digital asset conversions executed including the present digital asset conversion satisfies a threshold.

In some embodiments, the account management system 102 trains and uses various predictive models, optimization models, machine learning models, and/or the like to determine whether a significant change in unit supply or distribution of the source digital asset and/or the target digital asset is likely based at least in part on the present digital asset conversion. That is, the account management system 102 may determine whether a "run on points" may occur where large quantities of digital asset units are being credited or debited, dramatically changing the digital asset unit distribution and potentially causing fiat currency shortages or deficits, changes in digital asset value, and/or the like. Thus, the account management system 102 may predict the likelihood of significant changes in digital asset unit supply or distribution for the source digital asset and/or the target digital asset based at least in part on the present digital asset conversion and/or other conversion requests received in a current time period.

In some embodiments, the account management system 102 may communicate with the corresponding digital asset exchange system 106 to determine whether a "run on points" may occur or predict the likelihood of a significant change in digital asset unit supply or distribution for a particular digital asset (e.g., the source digital asset, the target digital asset). For example, the account management system 102 may indicate to the first digital asset exchange system 106A and/or the second digital asset exchange system 106B that a conversion execution request originating from the client device has been received and may also indicate the determined number of source digital asset units to debit and the determined number of target digital asset units to credit. The digital asset exchange system 106 may use various trained models and the indication from the account management system 102 to determine a likelihood of a significant change in digital asset unit supply or distribution.

In various embodiments, the account management system 102 may also establish various conversion thresholds and/or limits (e.g., for compliance with various rules and regulations). For example, the account management system 102 may limit the number of conversions that may be executed within a time period and/or may only execute conversions within a specific time period (e.g., transaction hours). Various other conversion thresholds and/or limits may be configured to monitor or detect fraudulent transactions. For example, the account management system 102 may limit the number of conversions executed for a specific end user within a specific time period.

If the account management system 102 determines that the digital asset conversion (e.g., the number of target digital asset units to credit and the number of source digital asset units to debit) does not satisfy the conversion thresholds and/or that a significant change in digital asset unit supply or distribution for the source digital asset and/or the target digital asset is likely, the digital asset conversion may be modified. For example, the number of source digital asset units to debit may be lowered to satisfy the conversion thresholds, and the number of target digital asset units to credit may be modified based at least in part on the aggregated conversion rate and the lowered number of source digital asset units to debit. In various embodiments, modifying the digital asset conversion comprises notifying the end user (e.g., via the client device 104) and receiving approval of the modified digital asset conversion. In some instances, the end user may choose to cancel the digital asset conversion after being notified that the digital asset conversion did not satisfy the conversion thresholds. In some embodiments, the account management system 102 may modify the digital asset conversion by canceling the digital asset conversion and accordingly notifying the end user (e.g., via the client device 104) that the digital asset conversion was canceled for not satisfying the conversion thresholds. In some embodiments, the account management system 102 receives a request from the digital asset exchange system 106 to cancel the requested digital asset conversion.

Otherwise, the account management system 102 may proceed to executing the digital asset conversion and may select a first digital asset user account and a second digital asset user account each associated with the end user, at step/operation 417. In various embodiments, the selected first digital asset user account is specifically used for the debit of source digital asset units, and the selected second digital asset user account is specifically used for the credit of target digital asset units. The account management system 102 may select a first digital asset user account from one or more first digital asset user accounts associated with the end user, and a target digital asset user account from one or more target digital asset user accounts associated with the end user. In various embodiments, the account management system 102 may receive an indication (e.g., the conversion execution request) originating from the client device 104 of a particular first digital asset user account and/or a particular second digital asset user account selected by the end user to be used in the conversion.

Figure 4C:
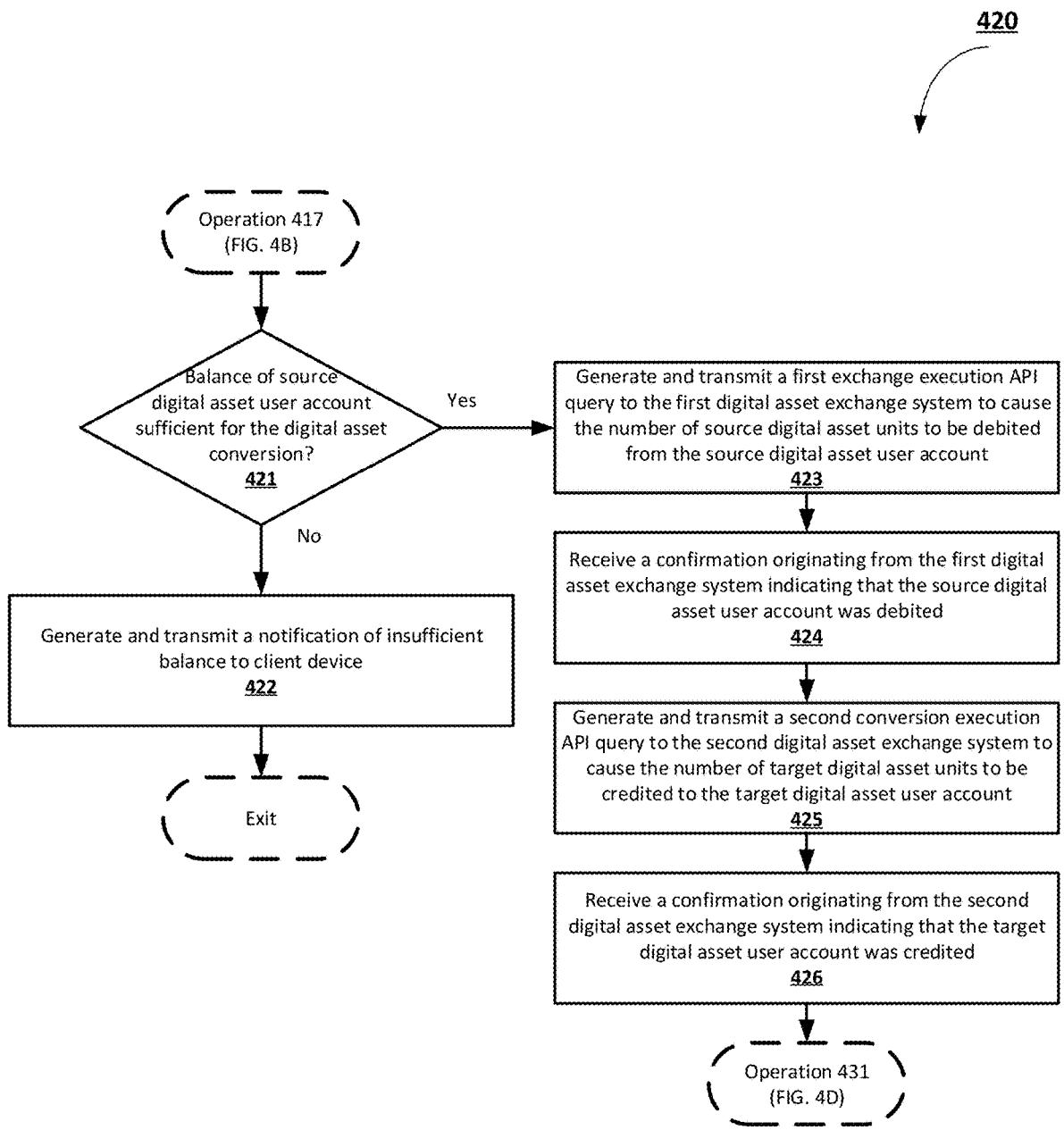

Referring now to FIG. 4C, a process 420 is providing for converting a source digital asset to a target digital asset. In some embodiments, process 420 may be performed subsequent to process 410 illustrated in FIG. 4B. In various embodiments, the account management system 102 comprises means, such as processing element 205, memories 210, 215, network interface 220, and/or the like, for performing each of the steps/operations of process 420 to convert a source digital asset to a target digital asset.

Process 420 comprises step/operation 421, in which the account management system 102 determines whether the source digital asset unit balance of the first digital asset user account is sufficient for the digital asset conversion. Specifically, the number of source digital asset units to debit may be compared to the unit balance of the first digital asset user account. The unit balance of the first digital asset user account may be accessible and/or retrieved from an account balance data object corresponding to the first digital asset user account. In some embodiments, the first digital asset exchange system 106A may store the account balance data object corresponding to the first digital asset user account, and the account management system 102 may determine or retrieve the unit balance of the first digital asset user account based at least in part on communicating with the first digital asset exchange system 106A.

If the unit balance of the first digital asset user account is insufficient or deficient for (e.g., less than) the number of source digital asset units to debit, then step/operation 422 may be performed, in various embodiments. Step/operation 422 comprises generating and transmitting a notification of insufficient balance to the client device 104. As such, the end user may be notified that the conversion may not be executed due to the insufficient or deficient unit balance of the first digital asset user account for the source digital asset. In some embodiments, step/operation 422 comprises canceling the conversion and notifying the end user of the cancelation. In other embodiments, step/operation 416 comprises enabling the end user to modify the conversion, such as by providing a user interface in which the end user may specify a new number of digital asset units to debit and/or in which the end user may select another digital asset user account for the debiting of the source digital asset.

Otherwise, step/operation 423 may be performed, in various embodiments. Step/operation 423 comprises generating and transmitting a first exchange execution API query to the first digital asset exchange system 106A. In various embodiments, the first exchange execution API query is configured to cause the number of source digital asset units to debit to be debited from the first digital asset user account (or another digital asset user account specified by the end user, for example). In instances where the source digital asset is a liability digital asset (e.g., loyalty points, reward points), the first digital asset exchange system 106A may update the unit balance of the first digital asset user account to reflect a debit, or subtraction, of the number of source digital asset units to debit. In other instances where the source digital asset is a cryptocurrency digital asset (e.g., Bitcoin, Ethereum, Ripple, Litecoin, Dogecoin), the first digital asset exchange system 106A may execute a cryptocurrency transaction (e.g., an on-chain cryptocurrency transaction) such that cryptocurrency digital asset units associated with the distributed ledger public key value and/or cryptocurrency address associated with the end user are transferred out of the distributed ledger public key value and/or a cryptocurrency address (e.g., to an operating cryptocurrency address of the first digital asset exchange system 106A). For example, the first digital asset exchange system 106A may commit an on-chain transaction record data object to a distributed ledger computing platform to execute the cryptocurrency transaction. In even further example instances, the source digital asset may be a single-unit digital asset, such as an NFT, and the digital asset exchange system 106 may debit the single-unit digital asset from the first digital asset user account by changing the ownership of the single-unit digital asset, or transferring the single-unit digital asset to another digital asset user account associated with another end user. Thus, in various embodiments, debiting a number of source digital asset units from the first digital asset user account may comprise transferring the number of source digital asset units to another account, another end user, the digital asset exchange system 106, and/or the like. In the exemplary illustrative scenario, the liability holder entity receives a request to exchange ten-thousand reward points for USD $100. The liability holder entity accordingly verifies the exchange request and debits ten-thousand reward points from the first digital asset user account.

Process 420 may further comprise step/operation 424, which comprises receiving a confirmation originating from the first digital asset exchange system 106A indicating that the first digital asset user account was debited by a debited number of source digital asset units. In various embodiments, the confirmation comprises additional information, such as a timestamp of the debit and if applicable, a recipient of the debited number of source digital asset units (e.g., recipient of an ownership token digital asset).

Process 420 may then comprise step/operation 425, which comprises generating and transmitting a second exchange execution API query to the second digital asset exchange system 106B. In various embodiments, the second exchange execution API query is configured to cause the number of target digital asset units to credit to be credited to the second digital asset user account. For example, the second digital asset exchange system 106B may update the unit balance of the second digital asset user account to reflect a credit, addition, deposit, and/or the like of the number of target digital asset units to credit. In some instances, the target digital asset may be a cryptoasset, and the second digital asset exchange system 106B may execute an on-chain transaction to credit the second digital asset user account with cryptoasset units. In the exemplary illustrative scenario, the entity managing the in-game assets receives a request to credit five-hundred in-game assets for USD $100. The entity accordingly verifies the exchange request and credits five-hundred in-game assets to the second digital asset user account. In various embodiments, the credit of target digital asset units may occur substantially concurrent or slightly subsequent to the debit of source digital asset units, advantageously enabling the end user to be in ownership of the desired target digital asset within a small timeframe.

Process 420 may further comprise step/operation 426, which comprises receiving a confirmation originating from the second digital asset exchange system 106B indicating that the second digital asset user account was credited with a credited number of target digital asset units. In various embodiments, the confirmation comprises additional information, such as a timestamp of the credit and if applicable, a source of the debited number of source digital asset units (e.g., an original owner of an ownership token digital asset).

Figure 4D:
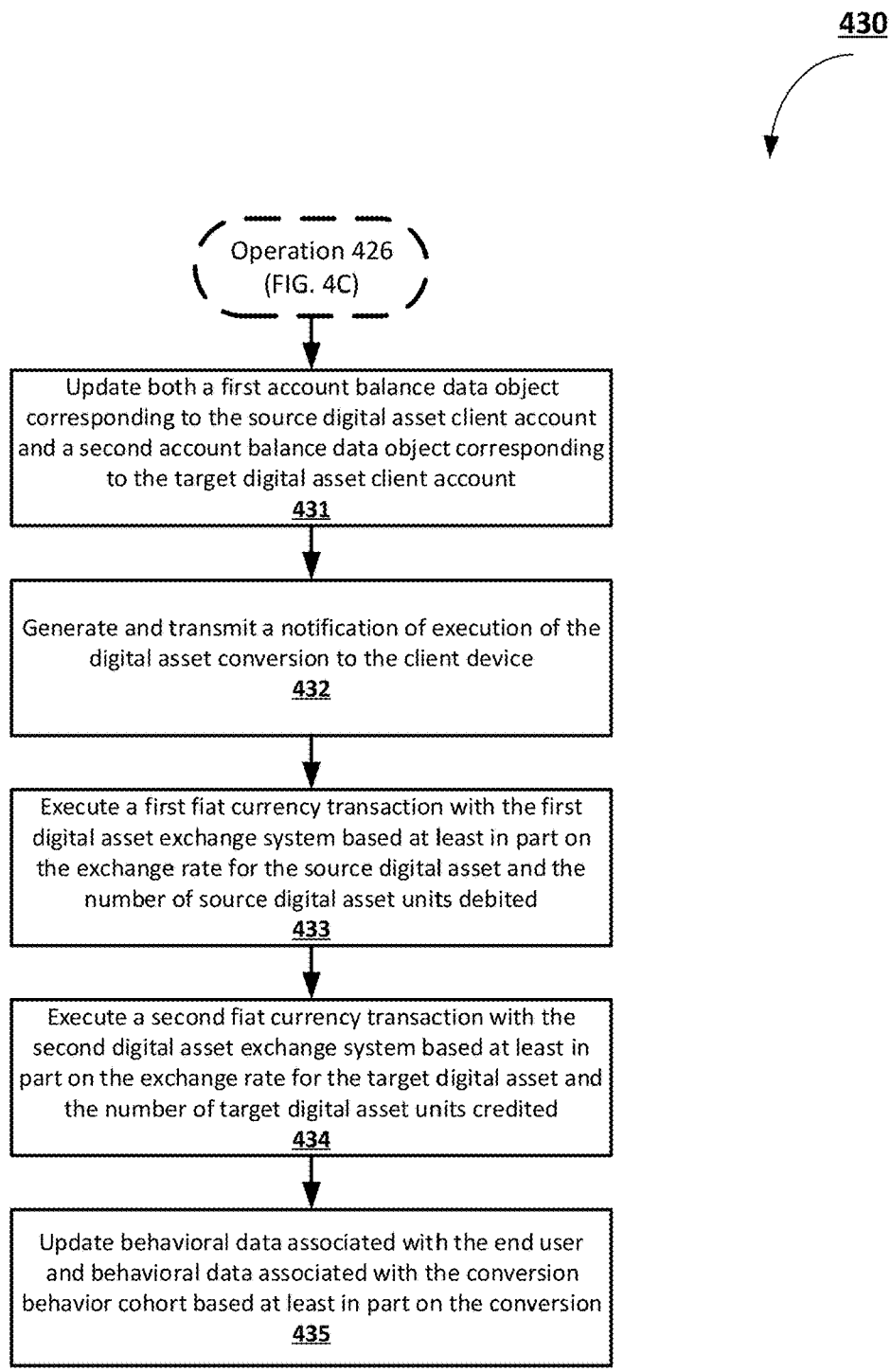

Thus, with process 420, individual exchanges of the source digital asset and the target digital asset may occur such that an end user may receive target digital assets. Specifically, source digital asset units are debited in a first exchange, and target digital asset units are credited in a second exchange. Referring now to FIG. 4D, a process 430 is provided for concluding a conversion of the source digital asset to the target digital asset, and the process 430 generally includes the transfer, or settlement, of fiat currency as part of the first exchange and the second exchange. In various embodiments, the account management system 102 comprises means, such as processing element 205, memories 210, 215, network interface 220, and/or the like, for performing each of the steps/operations of process 430 to conclude the digital asset conversion.

Process 430 may comprise step/operation 431, which comprises updating a first account balance data object corresponding to the first digital asset user account from which source digital asset units were debited, and updating a second account balance data object corresponding to the second digital asset user account to which target digital asset units were credited. In various embodiments, the account management system 102 may store account balance data objects corresponding to various different accounts, such as in memories 210, 215. In such embodiments, the account management system 102 may update the account balance data objects to reflect the debiting of source digital asset units from the first digital asset user account and the crediting of target digital asset units to the second digital asset user account.

In some embodiments, updating each account balance data object comprises generating and storing a transaction record data object associated with and/or within an account balance data object. For example, the account management system 102 may generate a transaction record data object describing the debiting of source digital asset units (e.g., the number of source digital asset units debited, the time of debiting, identifiers for the first digital asset user account, identifiers for the end user associated with the first digital asset user account) and associate and/or store the transaction record data object with the first account balance data object corresponding to the first digital asset user account. Similarly, the account management system 102 may generate a transaction record data object describing the crediting of target digital asset units (e.g., the number of target digital asset units credited, the time of crediting, identifiers for the second digital asset user account, identifiers for the end user associated with the second digital asset user account) and associate and/or store the transaction record data object with the second account balance data object corresponding to the second digital asset user account. Accordingly, a transaction history or historical account activity may be provided via an account balance data object.

In various embodiments, multiple different systems (e.g., one or more account management systems 102, one or more client devices 104, one or more digital asset exchange systems 106) may individually store an account balance data object for a first digital asset user account for the source digital asset and/or an account balance data object for a second digital asset user account for the target digital asset. In such embodiments, the account management system 102 may relay, broadcast, transmit, and/or the like a transaction record data object to other different systems, such that the other systems are aware of the debiting of source digital asset units from the first digital asset user account and the crediting of target digital asset units to the second digital asset user account. For example, the account balance data object for a digital asset user account may be a distributed ledger, and the account management system 102 commits a transaction record data object describing the debiting of digital asset units to the distributed ledger.

Process 430 may further comprise step/operation 432. Step/operation 432 comprises generating and transmitting a notification of execution of the conversion to the client device. In various embodiments, the notification may be any communication (e.g., telephonic conversion, text message, e-mail, push notification, user interface) indicating to the end user that the conversion of the source digital asset to the target digital asset was executed and completed. In various embodiments, the notification comprises additional information regarding the digital asset conversion, such as identifiers for the digital asset user account and/or the fiat currency user account, the number of source digital asset units finally debited, the number of target digital asset units finally credited, a resulting unit balance of the first digital asset unit balance, a resulting unit balance of the second digital asset unit balance, and/or the like.

As shown in FIG. 4D, process 430 comprises step/operation 433. Step/operation comprises executing a first fiat currency transaction with the first digital asset exchange system 106A based at least in part on the exchange rate for the source digital asset and the number of source digital asset units debited from the end user (or from the digital asset user account of the end user). In various embodiments, the first fiat currency transaction specifically involves the transfer of fiat currency units from a fiat currency account associated with the first digital asset exchange system 106A to a fiat currency central operating account associated with the account management system 102. In various embodiments, the first fiat currency transaction may occur subsequent to the debiting of the source digital asset units from the end user and may accordingly be a settlement for the debiting of the source digital asset units. Although conceptually, the debiting of source digital asset units from the end user would result in the end user receiving fiat currency (e.g., redeeming, exchanging source digital asset to fiat currency), the fiat currency is instead transferred to the fiat currency central operating account associated with the account management system 102 to be used for the purchase of target digital asset units. Thus, a unit balance of a fiat currency user account associated with the end user may remain unchanged. In various embodiments, executing the first fiat currency transaction between the account management system 102 and the first digital asset exchange system 106A comprises the account management system 102 receiving confirmation (e.g., originating from the first digital asset exchange system 106A, originating from an external banking system associated with an external banking entity or institution) that the first fiat currency transaction was executed.

As discussed, the first fiat currency transaction executed in step/operation 433 may be a settlement of fiat currency units, or a fiat currency settlement. In various embodiments, the first fiat currency transaction or settlement involves the transfer of at least a number of fiat currency units based at least in part on the exchange rate of the source digital asset and the number of source digital asset units. In the exemplary illustrative scenario, ten-thousand reward points are debited from the end user, and with the source exchange rate being ten-thousand reward points to USD $100, USD $100 is then transferred from a fiat currency account associated with the liability holder entity to a fiat currency central operating account associated with the account management system 102. In various embodiments, the transfer of fiat currency units may involve various techniques or systems, such as EFT, a wire transfer, an ACH transfer, a SWIFT or international money transfer, a SEPA transfer, and/or the like. In various embodiments, the execution of the first fiat currency transaction is responsive to a settlement request transmitted and originating from the account management system 102 and received by the first digital asset exchange system 106A. The settlement request may indicate and identify the debiting of the source digital asset units from the end user as well as the source exchange rate at the time of the debiting. For example, the settlement request comprises a transaction identifier, a transaction record data object, a timestamp, and/or the like describing the debiting of the source digital asset units and/or the source exchange rate at the time of the debiting.

In various embodiments, the first fiat currency transaction involves the settlement for a plurality of debits of source digital asset units from a plurality of end users. That is, the account management system 102 may simultaneously or substantially at the same time receive requests for a digital asset conversion from a plurality of end users and also cause the debiting of a source digital asset units from the plurality of end users within a configurable time period. For the conversions with the same source digital asset units, the account management system 102 may then generate and transmit a settlement request indicating the plurality of debits executed and associated source exchange rates, thereby requesting that the first fiat currency transaction involve the transfer of a sum of fiat currency units that would settle each debit of source digital asset units from the plurality of end users. In such instances, the settlement request may include line item details indicating and identifying each individual debit of source digital asset units within the configurable time period. As an example, the configurable time period may be a day, and the first fiat currency transaction involves the transfer of fiat currency units to settle a plurality of debits of source digital asset units within the same day.

As such, the execution of a first fiat currency transaction or settlement with the first digital asset exchange system 106A provides various technical advantages. When the first fiat currency transaction settles more than one debit of source digital asset units, network traffic, bandwidth, data storage, and/or the like are conserved and reduced, with only one settlement being executed from more than one debit. Accordingly, less processing time of fiat currency transactions is spent, and multiple fiat currency settlements that would be individually processed are aggregated and condensed into one processed transaction.

Process 430 further comprises step/operation 434, which involves the execution of a second fiat currency transaction with the second digital asset exchange system 106B based at least in part on the exchange rate for the target digital asset and the number of target digital asset units credited to the end user. The second fiat currency transaction specifically involves the transfer of fiat currency units from the fiat currency central operating account associated with the account management system 102 to a fiat currency account associated with the second digital asset exchange system 106B. Thus, the second fiat currency transaction may be understood as a delayed purchase or settlement for the target digital asset units already credited, as the second fiat currency transaction may occur subsequent to the crediting of target digital asset units to the end user. In the exemplary illustrative scenario, five-hundred in-game assets were credited to the end user, and with the target exchange rate being five-hundred in-game assets for USD $100, USD $100 is then transferred from the fiat currency central operating account associated with the account management system 102 to a fiat currency account associated with the entity managing the in-game assets (as a purchase or settlement of the five-hundred in-game assets). It may be appreciated that in some instances, the USD $100 transferred here may be the same USD $100 received from the liability holder entity for the debiting of the ten-thousand reward points. Thus, the fiat currency central operating account may be a holding account, a trust account, and/or the like, in some embodiments. It has been shown then that while from the perspective of the end user, the 500 in-game assets were purchased or converted from the ten-thousand reward points, the account management system 102 in reality exchanges the ten-thousand reward points for USD $100 and exchanges USD $100 for five-hundred in-game assets. In various embodiments, the second fiat currency transaction may occur immediate subsequent to, within a configurable time period of, and/or simultaneous with the first fiat currency transaction such that a unit balance of the fiat currency central operating account does not become less than any thresholds.

While in some embodiments, the second fiat currency transaction may be a settlement for the credit of target digital asset units to the end user, the second fiat currency transaction in other various embodiments may be a settlement for a plurality of credits of target digital asset units to a plurality of end users. In various embodiments then, the account management system 102 may settle a plurality of credits of target digital asset units to a plurality of end users that occurred within a configurable time period with one second fiat currency transaction, thereby increasing transaction efficiency, reducing transaction processing and communication resources, and/or the like.

Process 430 may further comprise step/operation 435, which comprises updating the conversion behavior analytics data object describing historical behavior of the end user and/or historical behavior of conversion behavior cohort of the end user based at least in part on the executed digital asset conversion. In various embodiments, updating the conversion behavior analytics data object comprises recording the execution of the digital asset conversion, the time of execution of the digital asset conversion, the conversion rate used for the execution of the digital asset conversion, demographic information and/or other information associated with the end user, and/or the like. In various embodiments, various predictive models, optimizations models, classification models, neural network models, supervised or unsupervised machine learning models, and/or the like may be updated, retrained, reconfigured, and/or the like with information for the executed digital asset conversion.

b. Exemplary User Interfaces

Having thus described various functions, steps/operations, methods, processes, and/or the like for converting a first/source digital asset to a second/target digital asset, additional steps/operations are herein described in the context of various user interfaces. In various embodiments, the user interfaces provided and described in the present disclosure are configured to be provided via a client device 104 (e.g., via a display 316). In other embodiments, the user interfaces may be provided via the account management system 102, a digital asset exchange system 106, and/or other various systems or devices involved in the digital asset conversion.

Figure 5:
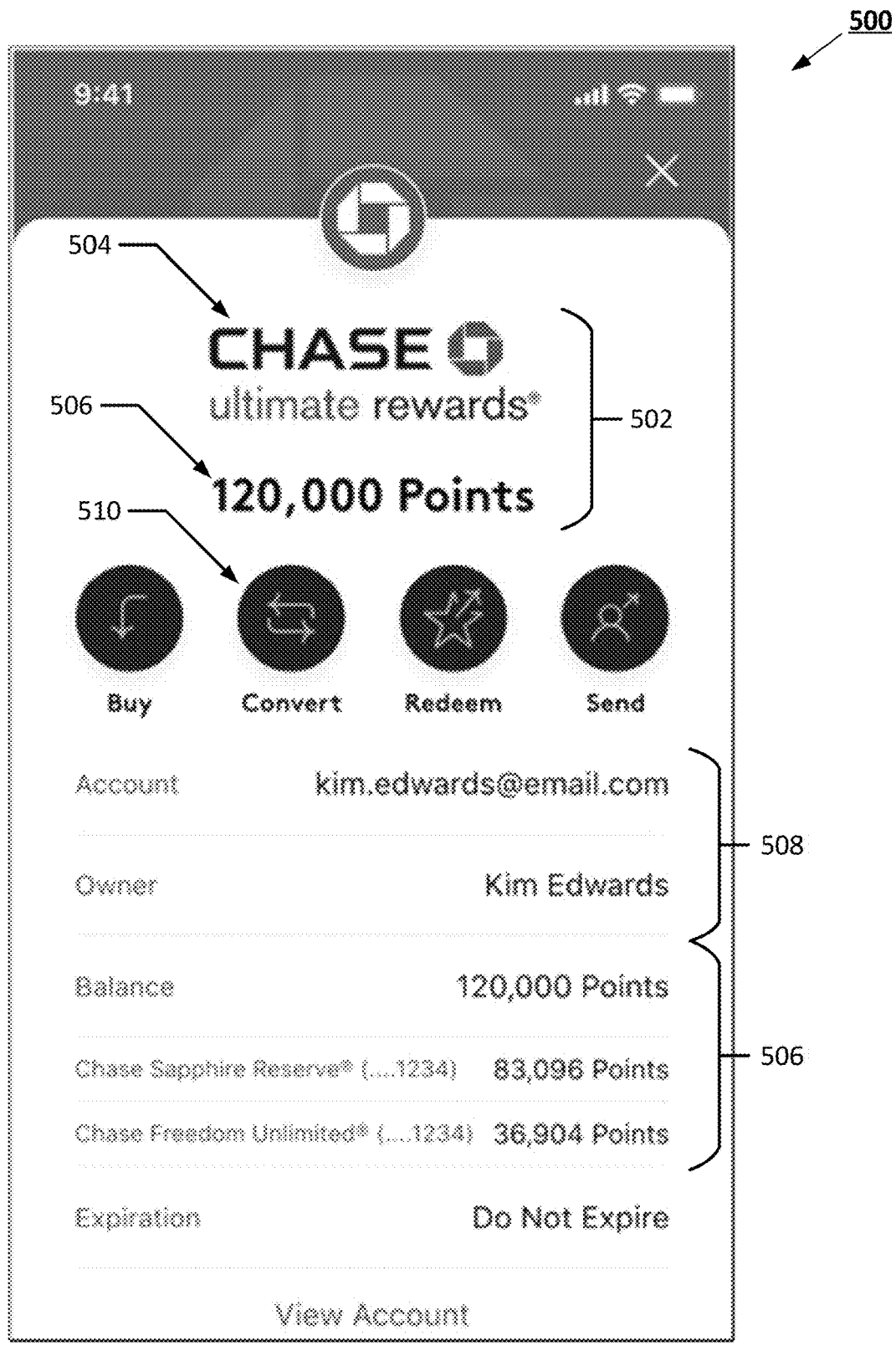

FIG. 5 provides a user interface 500 configured to enable an end user to request the initiation of a conversion of a source digital asset to target digital asset, which may implicitly comprise a conversion rate request (e.g., a conversion rate request received by the account management system 102 in step/operation 401). As illustrated in FIG. 5, the user interface 500 may indicate a particular source digital asset 502. The source digital asset 502 is managed, distributed by, and redeemed with an entity 504, also indicated via the user interface 500. The user interface 500 further indicates a source digital asset unit balance 506 of a first digital asset user account for the source digital asset. A first digital asset user account may also be understood as a source digital asset user account 508. For example, the user interface 500 indicates that the end user owns 120,000 reward points (the source digital asset 502). Such information including the source digital asset unit balance 506 and identifiers for the source digital asset user account 508 may be retrieved from an account balance data object corresponding to the source digital asset user account 508 when generating the user interface 500.

In various embodiments, the account balance data object corresponding to the source digital asset user account 508 may comprise one or more nested account balance data objects corresponding to other digital asset user accounts for the source digital asset 502. Accordingly, the user interface 500 may indicate an individual source digital asset unit balance 506 for each source digital asset user account 508 identified by the account balance data object and the one or more nested account balance data objects. For example, the source digital asset 502 may be credit card rewards points with a specific banking institution (the entity 504), and while the account balance data object may generally identify the end user and indicate a total source digital asset unit balance 506 (e.g., 120,000 reward points), the end user may own one or more individual credit card accounts each associated with an individual source digital asset unit balance 506 (e.g., 83,096 reward points and 36,904 reward points).

In various embodiments, the account balance data object is configured to record historical account activity, including usage of the source digital asset to purchase goods, services, fiat currency, other digital assets, and/or the like. For example, the account balance data object may comprise a plurality of transaction record data objects, each of which may be associated with a timestamp. In various embodiments, the end user may be enabled to view the historical account activity via a user interface (e.g., user interface 500).

In various embodiments, the user interface 500 is generated and provided by the client device 104, and thus, the client device 104 may have access to (e.g., stores in memories 322, 324, receives from the account management system 102) an account balance data object corresponding to the end user and/or to the source digital asset user account 508. In various embodiments, the client device 104 may request various information for the user interface 500 (e.g., source digital asset unit balance 506, historical account activity) from the account management system 102 when generating and/or updating the user interface 500. The account management system 102 may then retrieve such information from an account balance data object corresponding to the source digital asset user account 508 and provide such information to the client device 104.

As illustrated in FIG. 5, user interface 500 may comprise a conversion initiation mechanism 510 (e.g., a button labelled "Convert"). The conversion initiation mechanism 510 may be configured to be selectable or interactable with by an end user of the client device 104, and the client device 104 may be configured to monitor for user interaction with the conversion initiation mechanism 512. User interaction with the conversion initiation mechanism 512 may represent the desire by an end user to initiate the conversion of the source digital asset 502 to a target digital asset, and specifically the conversion of at least some of source digital asset units of the source digital asset unit balance 506 associated with the source digital asset user account 508 indicated by the user interface 500. In various embodiments, the end user may also select a particular target digital asset for the conversion via a user interface (e.g., user interface 500). Responsive to user interaction with the conversion initiation mechanism 510, the client device 104 may generate and transmit a conversion rate request indicating the source digital asset 502 and a target digital asset. Thus, in the illustrated embodiment, the end user may interact with the user interface 500 (e.g., via the conversion initiation mechanism 510) to indicate a desire to convert some of the 120,000 reward points of the source digital asset user account 508.

Figure 6:
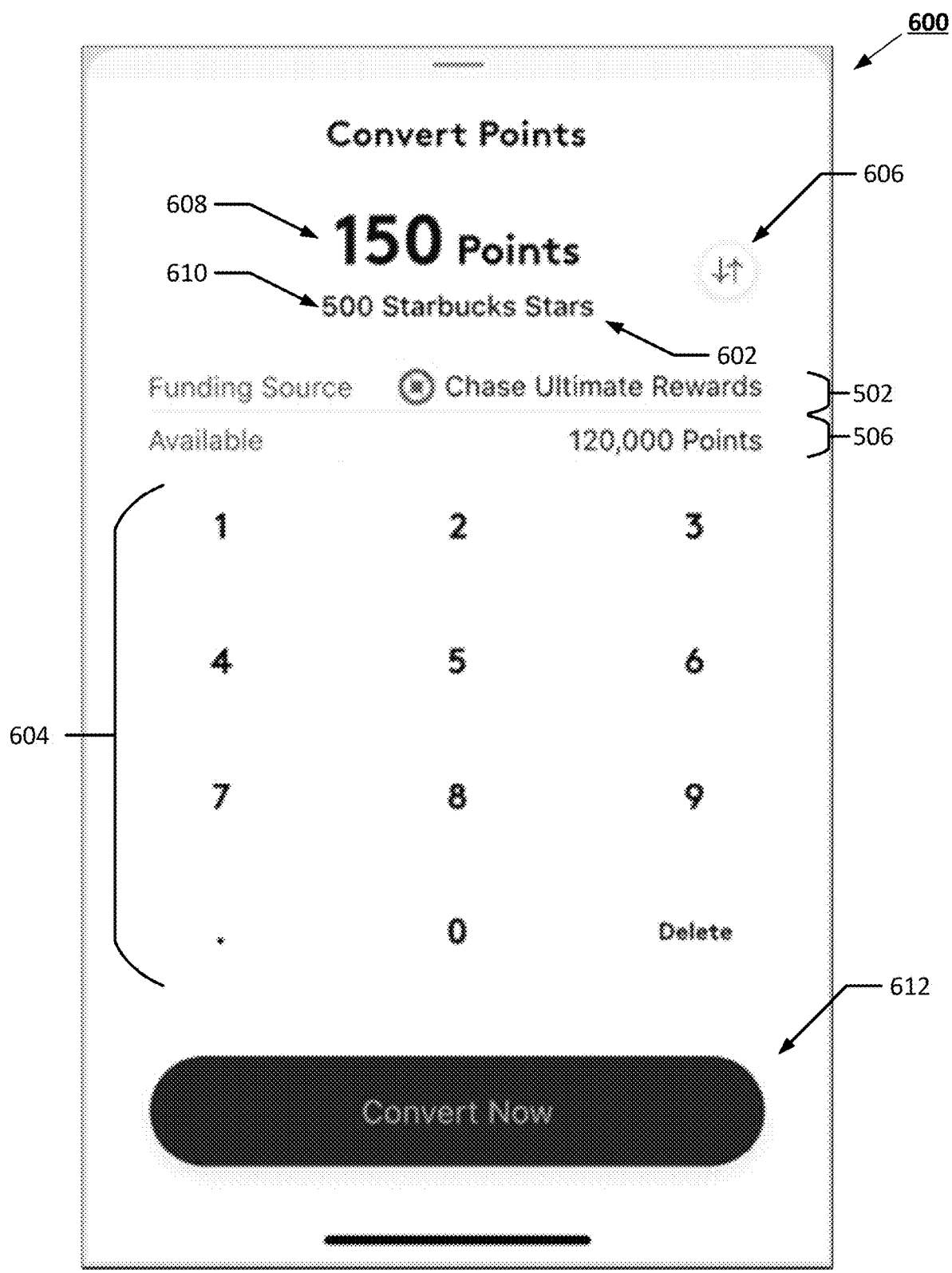

FIG. 6 provides an example user interface 600 for at least providing (e.g., displaying) the aggregated conversion rate between the source digital asset 502 and a target digital asset to the end user. For example, user interface 600 may be generated and displayed by client device 104 based at least in part on being provided the aggregated conversion rate between the source digital asset 502 and a target digital asset by the account management system 102 (e.g., in step/operation 411 of process 410). In some embodiments, user interface 600 may be generated and displayed by client device 104 subsequent to user interaction by the end user with the conversion initiation mechanism 510 in user interface 500.

As illustrated, the user interface 600 may indicate the source digital asset 502 for which the conversion is requested and initiated, as well as the source digital asset unit balance 506 associated with the source digital asset user account 508. User interface 600 may also indicate the target digital asset 602 to which the source digital asset 502 is converted. In various embodiments, the end user may select the target digital asset 602 via a user interface (e.g., user interface 500, user interface 600). In the illustrated embodiment for example, the target digital asset 602 is a liability points different from the reward points or the source digital asset 502.

User interface 600 may further comprise unit specification mechanisms 604 (e.g., numerical buttons, a keypad) and an input selection mechanism 606 (e.g., a button). In various embodiments, the unit specification mechanisms 604 (e.g., numerical buttons, a keypad) are configured to enable an end user to specify one of (i) a number of source digital asset units to convert (e.g., to debit from the source digital asset user account 508), or (ii) a number of target digital asset units to obtain (e.g., to credit to a second digital asset user account or a target digital asset user account) for a conversion.

In various embodiments, the unit specification mechanisms 604 may be used in conjunction with the input selection mechanism 606 to select whether user input or interaction with the unit specification mechanisms 604 specifies a number of source digital asset units or a number of target digital asset units. In the illustrated embodiment, user interface 600 indicates a number of source digital asset units to debit 608 and a number of target digital asset units to credit 610. As shown, the number of source digital asset units to debit 608 may be displayed in a format (e.g., font bolding, font color, font size) indicating that the number of source digital asset units to debit 608 was specified by the end user via the unit specification mechanisms 604 and/or that the unit specification mechanisms 604 are presently configured to specify a number of source digital asset units to debit 608 from user input or interaction. Responsive to user interaction with the input selection mechanism 606, however, the number of target digital asset units to credit 610 may be displayed in a format indicating that the number of target digital asset units to credit 610 was specified by the end user via the unit specification mechanisms 604, and the unit specification mechanisms 604 may be configured to specify a number of target digital asset units to credit 610 (instead of a number of source digital asset units to debit 608) from user interaction or input. In the illustrated embodiment then, the end user indicates via user interface 600 that the end user desires to redeem specifically one-hundred-and-fifty reward points (the source digital asset 502).

While an end user may specify one of (i) a number of source digital asset units to debit 608, or (ii) a number of target digital asset units to credit 610 (e.g., via the unit specification mechanisms 604 configured by input selection mechanism 606), the respective other one of (i) a number of source digital asset units to debit 608 or (ii) a number of target digital asset units to credit 610 may be automatically and in real-time generated based at least in part on the aggregated conversion rate between the source digital asset 502 and the target digital asset 602 (e.g., the aggregated conversion rate provided to the client device 104 in step/operation 411). Accordingly, the user interface 600 is configured to provide the conversion rate to the end user of the client device 104 on which the user interface 600 is displayed. In the illustrated embodiment then, the end user is made aware via user interface 600 that the end user may convert the specified one-hundred-and-fifty reward points (the source digital asset 502) for five-hundred liability points (the target digital asset 602).

In various embodiments, the client device 104 may have access to an account balance data object corresponding to the source digital asset user account 508. In such embodiments, the client device 104 may determine whether the specified number of source digital asset units to debit 608 is greater than or within some threshold of the source digital asset unit balance 506. For example, the client device 104 may generate a notification or alert via user interface 600 (not explicitly illustrated) that the number of source digital asset units specified by the end user via unit specification mechanisms 604 is an invalid number of digital asset units to debit due to an insufficient balance or due to the debit resulting in a source digital asset unit balance lower than a threshold.

In various embodiments, user interface 600 comprises a conversion unit confirmation mechanism 612. The conversion unit confirmation mechanism 612 may be intended to enable an end user to confirm both the number of source digital asset units to debit 608 and the number of target digital asset units to credit 610 as indicated by the user interface 600 (and specified by the end user via the unit specification mechanisms 604), and thereby also to enable the end user to confirm the aggregated conversion rate between the source digital asset 502 and the target digital asset 602. In some embodiments then, the conversion unit confirmation mechanism 612 may cause a conversion execution request to be transmitted such that the account management system 102 receives the conversion execution request (e.g., in step/operation 412 of process 400), indicating that the aggregated conversion rate between the source digital asset 502 and the target digital asset 602 has been provided to the end user and has also been approved and confirmed.

Figure 7:
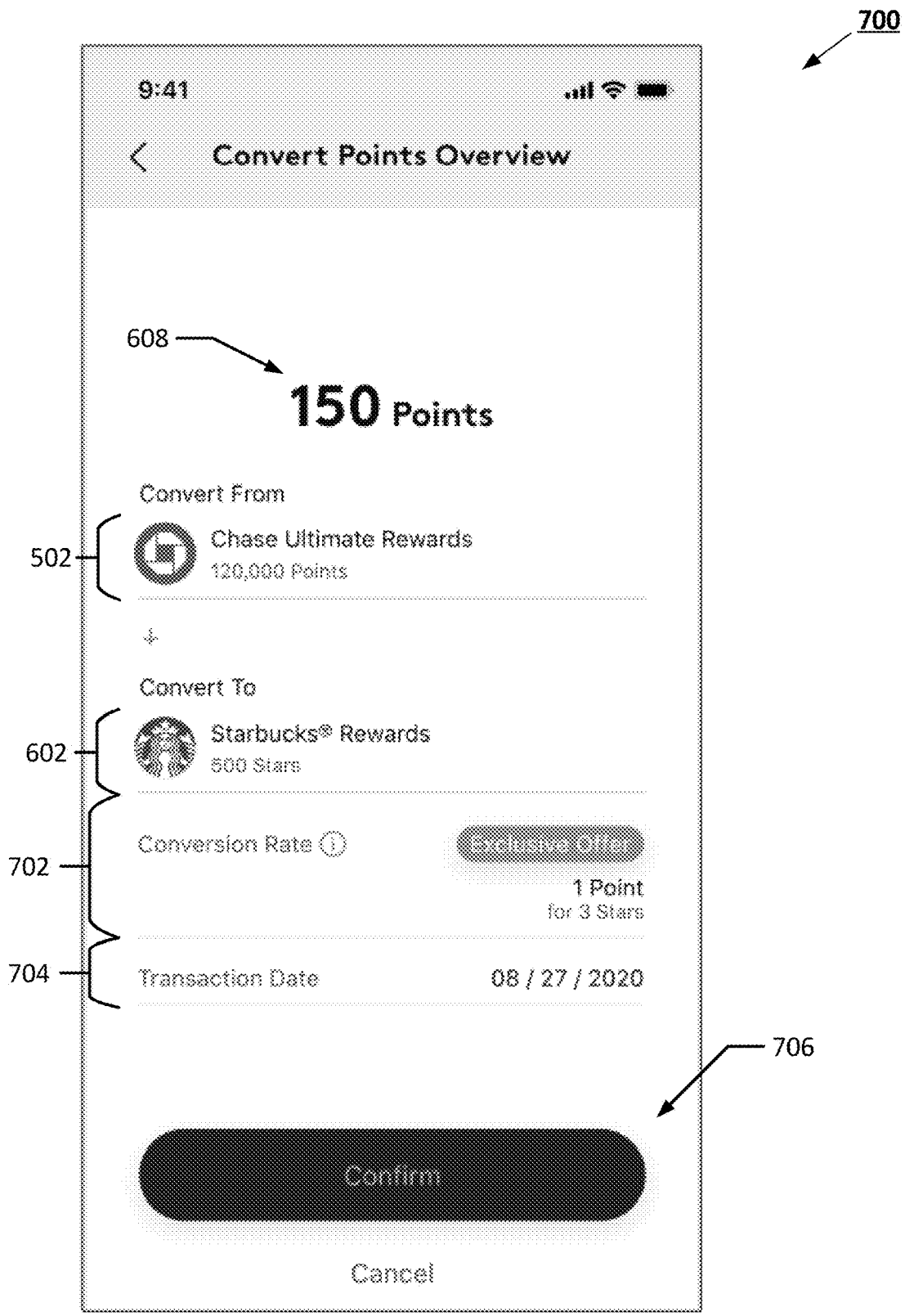

FIG. 7 illustrates a user interface 700 that may be displayed responsive to user interaction with the conversion unit confirmation mechanism 612. For example, the user interface 700 may be configured to enable an end user to review and confirm multiple aspects and details of the conversion of the source digital asset 502 to the target digital asset 602 before the execution of the conversion (e.g., before the client device 104 transmits a conversion execution request such that the account management system 102 receives the conversion execution request). For example, the user interface 700 enables the end user to confirm the number of source digital asset units to debit 608, the number of target digital asset units to credit 610, the first digital asset user account from which the source digital asset units will be debited, the target digital asset user account to which the target digital asset units will be credited, and any additional fees (e.g., in fiat currency), and various other information before the execution of the digital asset conversion.

Thus, in various embodiments, the user interface 700 may be configured to indicate the source digital asset 502, the target digital asset 602, the source digital asset user account 508, the target digital asset user account, the number of source digital asset units to debit 608, the number of target digital asset units to credit 610, and/or the like. In various embodiments, the user interface 700 may explicitly indicate the aggregated conversion rate 702 between the source digital asset 502 and the target digital asset 602. For example, in the illustrated embodiment, the user interface 700 indicates that the aggregated conversion rate 702 is one source digital asset unit to three target digital asset units. In some embodiments, the user interface 700 may further indicate the refresh time period and/or the execution time period for which the aggregated conversion rate may be accurate and/or valid. In the illustrated embodiment, the user interface 700 may be configured to indicate a relative benefit or nature of the aggregated conversion rate 702 based at least in part on historical aggregated conversion rates or trends thereof. As shown, the user interface 700 indicates that the aggregated conversion rate 702 is an exclusive offer. For example, the aggregated conversion rate 702 may offer the highest number of target digital asset units for one source digital asset units compared to historical aggregated conversion rates within a configurable time period.

User interface 700 may further indicate additional conversion execution information 704, such as any transaction fees and the date of the conversion, in the illustrated embodiment. In various embodiments, the account management system 102 may only execute digital asset conversion within certain time periods (e.g., hours), and as such, user interface 700 may indicate the next available time at which the account management system 102 will execute the requested digital asset conversion. As previously described, the aggregated conversion rate 702 may only be valid for execution within a configurable time period, or an execution time period. As such, in various embodiments, user interface 700 may continuously indicate to the end user the remaining time of the execution time period to execute the digital asset conversion at the aggregated conversion rate 702.

In various embodiments, user interface 700 comprises conversion execution mechanism 706. The conversion execution mechanism 706 may be intended to enable an end user to confirm the provided information relevant to the conversion as indicated by the user interface 700. Accordingly, the conversion execution mechanism 706 may cause a conversion execution request to be transmitted such that the account management system 102 receives the conversion execution request (e.g., in step/operation 412 of process 400), indicating that the end user desires the conversion to be executed with the provided aggregated conversion rate 702 between the source digital asset 502 and the target digital asset 602. Thus, in the illustrated embodiment, the end user may indicate via user interface 700 that the end user has reviewed and confirmed the aggregated conversion rate 702 and desires to proceed with converting one-hundred-and-fifty reward points to five-hundred liability points.

Figure 8:
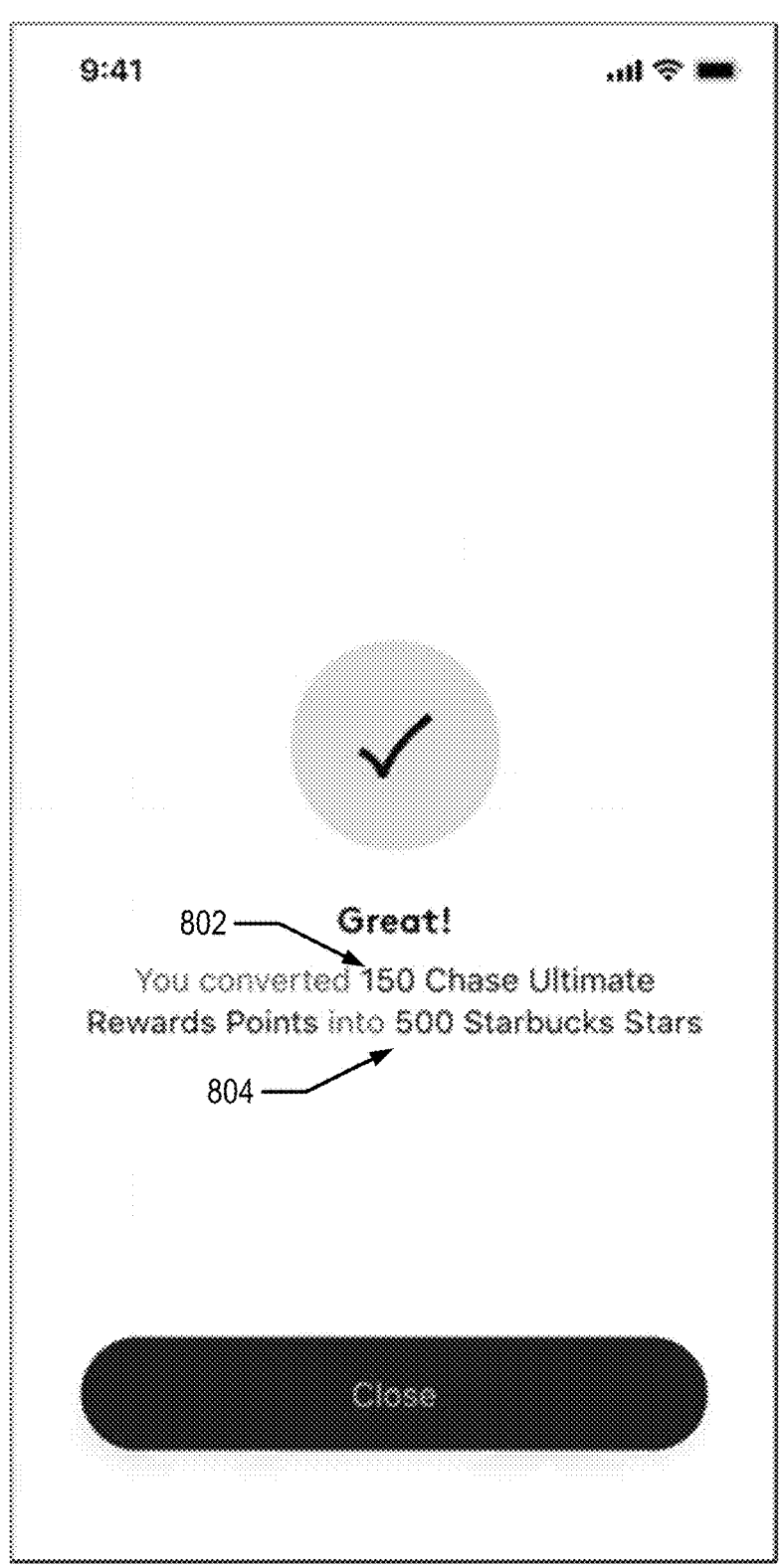

FIG. 8 provides a user interface 800 configured to notify the end user that the conversion of the source digital asset 502 to the target digital asset 602 was executed and completed. User interface 800 may then be provided subsequent to user interaction with the conversion execution mechanism 706 in user interface 700. User interface 800 may be configured to indicate to the end user of the client device 104 that the conversion of the source digital asset 502 to the target digital asset 602 was executed, or specifically that a number of source digital asset units 802 were debited from a first digital asset user account and a number of target digital asset units 804 were credited to a target digital asset user account. It may be appreciated that the number of source digital asset units 802 actually debited may or may not be the original number of source digital asset units to debit 608 as specified by the end user and indicated in previous user interfaces (e.g., user interface 600, user interface 700) for various factors, such as the conversion thresholds and/or limits established by the digital asset exchange system 106 or various fees for executing the digital asset conversion. Likewise, the number of target digital asset units 804 actually credited may or may not be the original number of target digital asset units to credit 610. In the illustrated embodiment, the end user is informed via user interface 800 that the conversion between the source digital asset 502 and the target digital asset 602 has been executed, and that the end user has been credited with five-hundred liability points. Additionally, the end user is notified that the end user has one-hundred-and-fifty fewer reward points in the source digital asset user account 508.

Subsequent to user interface 800, an updated user interface similar to user interface 500 may be provided via the client device 104. Various information within the updated user interface may reflect the executed and completed conversion. For example, in the illustrated embodiment, the source digital asset unit balance 506 may indicate 119,850 units, due to the debiting of one-hundred-and-fifty source digital asset units from the original balance of 120,000 units. In various embodiments, the executed and completed conversion may be indicated within the historical account activity with a timestamp associated with the execution of the conversion. An account balance data object corresponding to the source digital asset user account 508 may be updated subsequent or during the execution of the digital asset conversion. For example, a transaction record data object describing the conversion may be generated and stored with the account balance data object. Accordingly, the client device 104 may generate and provide the updated user interface based at least in part on the updated account balance data object. Information for the second digital asset user account for the target digital asset may additionally be provided to the end user via the updated user interface and/or another user interface. Specifically, an updated target digital asset unit balance may be indicated to the end user.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
training a predictive machine learning model in a supervised manner using data describing whether an end user or a conversion behavior cohort of the end user has historically exchanged a source digital asset for a range of source exchange rates and a target digital asset for a range of target exchange rates;
determining a first source exchange rate for the source digital asset and a fiat currency, wherein the first source exchange rate is determined based at least in part on:
generating and transmitting a first source exchange rate application programming interface (API) request, wherein the first source exchange rate API request indicates the source digital asset and is associated with a source digital asset user account identifiable by an identifier token associated with the end user, and wherein the first source exchange rate API request comprises a first conversion behavior analytics data object, determining the first source exchange rate based at least in part on providing the first conversion behavior analytics data object to the predictive machine learning model, and receiving a first source exchange rate API response comprising the first source exchange rate for the source digital asset and the fiat currency;

determining a first target exchange rate for the target digital asset and the fiat currency, wherein the first target exchange rate is determined based at least in part on:

generating and transmitting a first target exchange rate API request, wherein the first target exchange rate API request indicates the target digital asset and is associated with a target digital asset user account identifiable by the identifier token associated with the end user, and wherein the first target exchange rate API request comprises a second conversion behavior analytics data object, determining the first target exchange rate based at least in part on providing the second conversion behavior analytics data object to the predictive machine learning model, and receiving a first target exchange rate API response comprising the first target exchange rate for the target digital asset and the fiat currency;

generating a first aggregated conversion rate for the source digital asset and the target digital asset based at least in part on the first source exchange rate and the first target exchange rate;

providing the first aggregated conversion rate for display via a client device, wherein the first aggregated conversion rate is provided in response to a first digital asset conversion request indicating the source digital asset and the target digital asset and received at a first timepoint;

responsive to determining that a first configurable time period has elapsed:

generating a second aggregated conversion rate based at least in part on transmitting a second source exchange API request comprising the first conversion behavior analytics data object and a second target exchange API request comprising the second conversion behavior analytics data object, determining a second source exchange rate based at least in part on providing the first conversion behavior analytics data object to the predictive machine learning model, determining a second target exchange rate based at least in part on providing the second conversion behavior analytics data object to the predictive machine learning model, receiving a second source exchange rate API response comprising the second source exchange rate and a second target exchange rate API response comprising the second target exchange rate, wherein the second aggregated conversion rate is based at least in part on the second source exchange rate and the second target exchange rate, and providing the second aggregated conversion rate for display via the client device;

receiving a second digital asset conversion request, wherein the second digital asset conversion request is (i) received at a second timepoint, (ii) associated with both the source digital asset user account and the target digital asset user account each identifiable by the identifier token associated with the end user, and (iii) indicates a number of source digital asset units;

executing a digital asset conversion for the second digital asset conversion request within a second configurable time period, wherein executing the digital asset conversion comprises causing the number of source digital asset units to be debited from the source digital asset user account and causing a number of target digital asset units to be credited to the target digital asset user account;

dynamically providing a notification of execution of the digital asset conversion via the client device;

updating a first account balance data object associated with the source digital asset user account and a second account balance data object associated with the target digital asset user account based at least in part on the digital asset conversion; and subsequent to executing the digital asset conversion:

executing a first fiat currency transaction with a first digital asset exchange system associated with the source digital asset, and executing a second fiat currency transaction with a second digital asset exchange system associated with the target digital asset.

2. The computer-implemented method of claim 1, wherein the second source exchange rate API response comprises one or more source rate-specific thresholds associated with the second source exchange rate, and the second target exchange rate API response comprises one or more target rate-specific thresholds associated with the second target exchange rate; and wherein the second aggregated conversion rate is generated to satisfy each of the one or more source rate-specific thresholds and the one or more target rate-specific thresholds.

3. The computer-implemented method of claim 1, wherein the identifier token is federated and configured to identify a plurality of digital asset user accounts associated with the end user and managed by one or more different digital asset exchange systems.

4. The computer-implemented method of claim 1, wherein providing the second aggregated conversion rate for display via the client device comprises dynamically determining the number of target digital asset units to be credited based at least in part on the second aggregated conversion rate and the number of source digital asset units to be debited, and displaying the number of target digital asset units to be credited via the client device.

5. The computer-implemented method of claim 1, wherein executing the digital asset conversion comprises:

determining whether the number of source digital asset units to be debited, the number of target digital asset units to be credited, and/or the digital asset conversion satisfy one or more configurable conversion thresholds, wherein at least one of the one or more configurable conversion thresholds is configured by the first digital asset exchange system or the second digital asset exchange system, and responsive to determining that the number of source digital asset units to be debited, the number of target digital asset units to be credited, and/or the digital asset conversion do not satisfy the one or more configurable conversion thresholds, modifying at least the number of source digital asset units to be debited.

6. The computer-implemented method of claim 1, wherein causing the number of source digital asset units to be debited from the source digital asset user account and causing the number of target digital asset units to be credited to the target digital asset user account comprises:
  generating and transmitting a first execution API request such that the first digital asset exchange system receives the first execution API request, wherein the first execution API request indicates the number of source digital asset units to debit and is configured to cause the first digital asset exchange system to debit the number of source digital asset units from the source digital asset user account identifiable by the identifier token associated with the end user;
  receiving a first execution API response indicating that the number of source digital asset units was debited from the source digital asset user account;
  generating and transmitting a second execution API request such that the second digital asset exchange system receives the second execution API request, wherein the second execution API request indicates the number of target digital asset units to credit and is configured to cause the second digital asset exchange system to credit the number of target digital asset units to the target digital asset user account identifiable by the identifier token associated with the end user; and
  receiving a second execution API response originating from the second digital asset exchange system indicating that the number of target digital asset units was credited to the target digital asset user account.

7. The computer-implemented method of claim 1, wherein the first account balance data object is nested within a third account balance data object associated with the end user and configured to describe a total balance of source digital assets associated with the end user, and the second account balance data object is nested within a fourth account balance data object associated with the end user and configured to describe a total balance of the target digital assets associated with the end user.

8. The computer-implemented method of claim 1, further comprising:
  receiving an API request originating from one of the first digital asset exchange system or the second digital asset exchange system, the API request comprising one of the third source exchange rate or the third target exchange rate;
  generating a third aggregated conversion rate for the source digital asset and the target digital asset based at least in part on the one of the third source exchange rate or the third target exchange rate; and
  providing the third aggregated conversion rate for display via a client device.

9. The computer-implemented method of claim 1, wherein executing the first fiat currency transaction with the first digital asset exchange system comprises:
  generating and transmitting a settlement request such that the first digital asset exchange system receives the settlement request, the settlement request indicating a number of fiat currency units based at least in part on the number of source digital asset units to be debited and the second source exchange rate; and
  causing the number of fiat currency units to be transferred from a fiat currency account associated with the first digital asset exchange system to a fiat currency central operating account.

10. The computer-implemented method of claim 1, wherein executing the second fiat currency transaction with the second digital asset exchange system comprises:
  receiving a settlement request originating from the second digital asset exchange system, the settlement request indicating a number of fiat currency units based at least in part on the number of target digital asset units to be credited and the second target exchange rate; and
  causing at least the number of fiat currency units to be transferred from a fiat currency central operating account to a fiat currency account associated with the second digital asset exchange system.

11. A system comprising one or more memory storage areas and one or more processors, the system configured for:
  training a predictive machine learning model in a supervised manner using data describing whether an end user or a conversion behavior cohort of the end user has historically exchanged a source digital asset for a range of source exchange rates and a target digital asset for a range of target exchange rates;
  determining a first source exchange rate for the source digital asset and a fiat currency, wherein the first source exchange rate is determined based at least in part on:
    generating and transmitting a first source exchange rate application programming interface (API) request, wherein the first source exchange rate API request indicates the source digital asset and is associated with a source digital asset user account identifiable by an identifier token associated with the end user, and wherein the first source exchange rate API request comprises a first conversion behavior analytics data object,
    determining the first source exchange rate based at least in part on providing the first conversion behavior analytics data object to the predictive machine learning model, and
    receiving a first source exchange rate API response comprising the first source exchange rate for the source digital asset and the fiat currency;
  determining a first target exchange rate for the target digital asset and the fiat currency, wherein the first target exchange rate is determined based at least in part on:
    generating and transmitting a first target exchange rate API request, wherein the first target exchange rate API request indicates the target digital asset and is associated with a target digital asset user account identifiable by the identifier token associated with the end user, and wherein the first target exchange rate API request comprises a second conversion behavior analytics data object,
    determining the first target exchange rate based at least in part on providing the second conversion behavior analytics data object to the predictive machine learning model, and
    receiving a first target exchange rate API response comprising the first target exchange rate for the target digital asset and the fiat currency;
  generating a first aggregated conversion rate for the source digital asset and the target digital asset based at least in part on the first source exchange rate and the first target exchange rate;
  providing the first aggregated conversion rate for display via a client device, wherein the first aggregated conversion rate is provided in response to a first digital asset conversion request indicating the source digital asset and the target digital asset and received at a first timepoint;
  responsive to determining that a first configurable time period has elapsed:
    generating a second aggregated conversion rate based at least in part on transmitting a second source exchange API request comprising the first conversion behavior analytics data object and a second target exchange API request comprising the second conversion behavior analytics data object, determining a second source exchange rate based at least in part on providing the first conversion behavior analytics data object to the predictive machine learning model, determining a second target exchange rate based at least in part on providing the second conversion behavior analytics data object to the predictive machine learning model, receiving a second source exchange rate API response comprising the second source exchange rate and a second target exchange rate API response comprising the second target exchange rate, wherein the second aggregated conversion rate is based at least in part on the second source exchange rate and the second target exchange rate, and providing the second aggregated conversion rate for display via the client device;

receiving a second digital asset conversion request, wherein the second digital asset conversion request is (i) received at a second timepoint, (ii) associated with both the source digital asset user account and the target digital asset user account each identifiable by the identifier token associated with the end user, and (iii) indicates a number of source digital asset units;

executing a digital asset conversion for the second digital asset conversion request within a second configurable time period, wherein executing the digital asset conversion comprises causing the number of source digital asset units to be debited from the source digital asset user account and causing a number of target digital asset units to be credited to the target digital asset user account;

dynamically providing a notification of execution of the digital asset conversion via the client device;

updating a first account balance data object associated with the source digital asset user account and a second account balance data object associated with the target digital asset user account based at least in part on the digital asset conversion; and subsequent to executing the digital asset conversion:
executing a first fiat currency transaction with a first digital asset exchange system associated with the source digital asset, and
executing a second fiat currency transaction with a second digital asset exchange system associated with the target digital asset.

12. The system of claim 11, wherein the second source exchange rate API response comprises one or more source rate-specific thresholds associated with the second source exchange rate, and the second target exchange rate API response comprises one or more target rate-specific thresholds associated with the second target exchange rate; and wherein the second aggregated conversion rate is generated to satisfy each of the one or more source rate-specific thresholds and the one or more target rate-specific thresholds.

13. The system of claim 11, wherein the identifier token is federated and configured to identify a plurality of digital asset user accounts associated with the end user and managed by one or more different digital asset exchange systems.

14. The system of claim 11, wherein providing the second aggregated conversion rate for display via the client device comprises dynamically determining the number of target digital asset units to be credited based at least in part on the second aggregated conversion rate and the number of source digital asset units to be debited, and displaying the number of target digital asset units to be credited via the client device.

15. The system of claim 11, wherein executing the digital asset conversion comprises:
determining whether the number of source digital asset units to be debited, the number of target digital asset units to be credited, and/or the digital asset conversion satisfy one or more configurable conversion thresholds, wherein at least one of the one or more configurable conversion thresholds is configured by the first digital asset exchange system or the second digital asset exchange system, and
responsive to determining that the number of source digital asset units to be debited, the number of target digital asset units to be credited, and/or the digital asset conversion do not satisfy the one or more configurable conversion thresholds, modifying at least the number of source digital asset units to be debited.

16. The system of claim 11, wherein executing the first fiat currency transaction with the first digital asset exchange system comprises:
generating and transmitting a settlement request such that the first digital asset exchange system receives the settlement request, the settlement request indicating a number of fiat currency units based at least in part on the number of source digital asset units to be debited and the second source exchange rate; and
causing the number of fiat currency units to be transferred from a fiat currency account associated with the first digital asset exchange system to a fiat currency central operating account.

17. The system of claim 11, wherein executing the second fiat currency transaction with the second digital asset exchange system comprises:
receiving a settlement request originating from the second digital asset exchange system, the settlement request indicating a number of fiat currency units based at least in part on the number of target digital asset units to be credited and the second target exchange rate; and
causing at least the number of fiat currency units to be transferred from a fiat currency central operating account to a fiat currency account associated with the second digital asset exchange system.

* * * * *

UNITED STATES PATENT AND TRADEMARK OFFICE
CERTIFICATE OF CORRECTION

| | |
|---|---|
| PATENT NO. | : 12,033,140 B2 |
| APPLICATION NO. | : 17/377178 |
| DATED | : July 9, 2024 |
| INVENTOR(S) | : Christopher Michael Petersen et al. |

It is certified that error appears in the above-identified patent and that said Letters Patent is hereby corrected as shown below:

In the Claims

In Column 53, Line 35, Claim 7, delete "of the" and insert -- of --, therefor.

Signed and Sealed this
Fifteenth Day of October, 2024

Katherine Kelly Vidal
*Director of the United States Patent and Trademark Office*